(12) United States Patent
Masuko et al.

(10) Patent No.: US 8,880,990 B2
(45) Date of Patent: Nov. 4, 2014

(54) INFORMATION PROCESSING DEVICE, INFORMATION PROCESSING METHOD, INFORMATION PROCESSING PROGRAM, AND RECORDING MEDIUM ON WHICH INFORMATION PROCESSING PROGRAM IS RECORDED

(75) Inventors: Soh Masuko, Shinagawa-ku (JP); Hiroshi Abe, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/817,055

(22) PCT Filed: Jun. 17, 2011

(86) PCT No.: PCT/JP2011/063921
§ 371 (c)(1),
(2), (4) Date: Feb. 14, 2013

(87) PCT Pub. No.: WO2012/172681
PCT Pub. Date: Dec. 20, 2012

(65) Prior Publication Data
US 2013/0145254 A1    Jun. 6, 2013

(51) Int. Cl.
G06F 17/00    (2006.01)
G06F 17/22    (2006.01)
G06Q 30/06    (2012.01)

(52) U.S. Cl.
CPC ........ G06F 17/2247 (2013.01); G06Q 30/0601 (2013.01); G06G 17/30286 (2013.01)
USPC ........... 715/204; 715/202; 715/203; 715/706; 705/14.73

(58) Field of Classification Search
USPC ................. 715/203, 204, 243, 246, 202, 706; 705/14.73
See application file for complete search history.

(56) References Cited

U.S. PATENT DOCUMENTS 6,738,804 B1    5/2004 Lo
2001/0056498 A1    12/2001 Kohda et al.
(Continued)

FOREIGN PATENT DOCUMENTS

CN    10202747472 A    4/2011
JP    2002-32677 A    1/2002
(Continued)

OTHER PUBLICATIONS

JP Notice of Allowance issued Feb. 12, 2013 in corresponding Japanese Patent Application No. 2012-557316.
(Continued)

Primary Examiner — Stephen Hong
Assistant Examiner — Matthew Ludwig
(74) Attorney, Agent, or Firm — Sughrue Mion, PLLC

(57) ABSTRACT

An information processing device that acquires data constituting a Web page that is to be provided to a terminal device via a network and is designed for displaying predetermined content information. The information processing device then acquires a script that is programmed to allow reference to correspondence information associating candidate content information that is set beforehand as a candidate for content information to be displayed on the Web page, with variation information specifying variations of at least the display form of an object to be displayed on the Web page. The information processing device incorporates the script into the page data in an executable manner. In response to a request from the terminal device, the information processing device transmits the page data having the script incorporated thereinto, to the terminal device.

12 Claims, 17 Drawing Sheets

(56) References Cited

U.S. PATENT DOCUMENTS

| | | |
|---|---|---|
| 2002/0073176 A1 | 6/2002 | Ikeda et al. |
| 2007/0266326 A1* | 11/2007 | Evans et al. ............... 715/747 |
| 2009/0292984 A1* | 11/2009 | Bauchot et al. ............ 715/234 |
| 2011/0213655 A1* | 9/2011 | Henkin et al. ............ 705/14.49 |

FOREIGN PATENT DOCUMENTS

| | | |
|---|---|---|
| JP | 2002-175316 A | 6/2002 |
| JP | 2003-85389 A | 3/2003 |
| JP | 2003-514307 A | 4/2003 |
| JP | 2004-508629 A | 3/2004 |
| JP | 2008-294617 A | 12/2008 |
| WO | 01/22241 A1 | 3/2001 |
| WO | 01/32302 A1 | 5/2001 |
| WO | 02/21238 A2 | 3/2002 |

OTHER PUBLICATIONS

Canadian Office Action dated Jun. 5, 2013, issued in Canadian Patent Application No. 2,812,518.

* cited by examiner

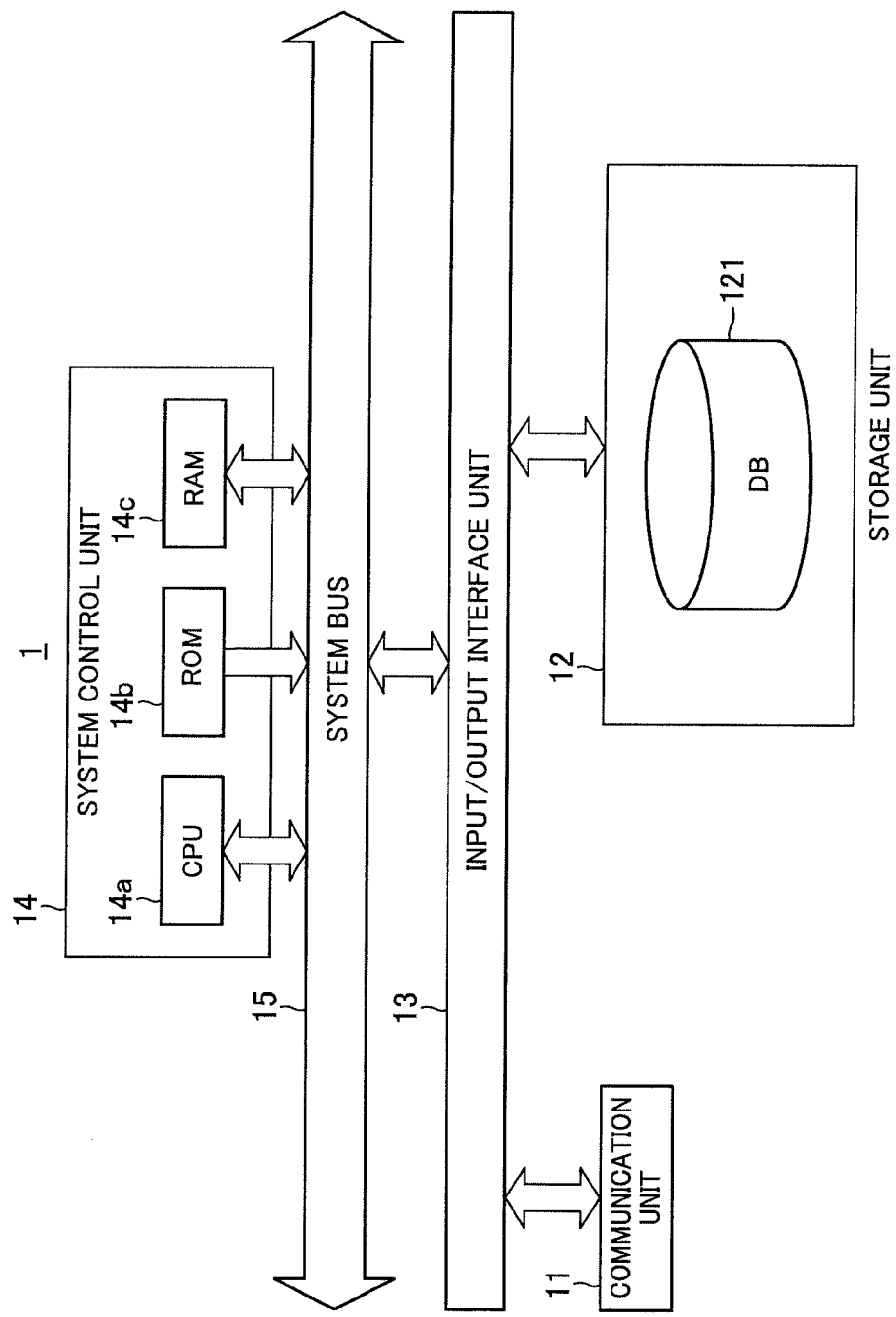

FIG.3

| | CANDIDATE CONTENT INFORMATION | ACTION INFORMATION ABOUT OBJECT OB1 | ACTION INFORMATION ABOUT OBJECT OB2 | ACTION INFORMATION ABOUT OBJECT OBn |
|---|---|---|---|---|
| RD1 { | THE GREATEST BARGAIN | SCRIPT FOR "JUMPING" | SCRIPT FOR "JUMPING" | ....... |
| | CAMPAIGN | SCRIPT FOR "RAISING ARMS UP" | SCRIPT FOR "RAISING ARMS UP" | ....... |
| | FIRST COME, FIRST SERVED | SCRIPT FOR "BEGINNING TO RUN" | – | ....... |
| | SALE | – | SCRIPT FOR "BEGINNING TO RUN" | ....... |
| | PRESENTS | SCRIPT FOR "PEACE SIGN" | – | ....... |
| | X TIMES MORE POINTS | SCRIPT FOR "CONFETTI" | SCRIPT FOR "JUMPING" | ....... |
| RD2 { | Y% OFF | SCRIPT FOR "RAISING ARMS UP" | SCRIPT FOR "CONFETTI" | ....... |
| | COUPONS | – | SCRIPT FOR "PEACE SIGN" | ....... |
| RD3 { | FOR THE FIRST Z PERSONS | SCRIPT FOR "BEGINNING TO RUN" | SCRIPT FOR "BEGINNING TO RUN" | ....... |
| | HALF PRICE | SCRIPT FOR "RAISING ARMS UP" | SCRIPT FOR "PEACE SIGN" | ....... |
| | GOOD BUY | SCRIPT FOR "JUMPING" | SCRIPT FOR "JUMPING" | ....... |
| | IMPERFECT ARTICLES | – | – | ....... |
| | FLAWED ARTICLES | SCRIPT FOR "SPEECH BALLOON" | SCRIPT FOR "SPEECH BALLOON" | ....... |
| | REMAINDERS | SCRIPT FOR "FOLDING ARMS" | – | ....... |
| | LIMITED SALE | – | SCRIPT FOR "FOLDING ARMS" | |
| | 24 HOURS | SCRIPT FOR "RAISING ARMS UP" | SCRIPT FOR "BEGINNING TO RUN" | ....... |
| RD4 { | RELIEF GOODS | – | SCRIPT FOR "RAISING ARMS UP" | |
| RD5 { | ABCDEF | – | SCRIPT FOR "SUPPORTING SPEECH BALLOON" | ....... |
| | ....... | ....... | SCRIPT FOR "WARNING SPEECH BALLOON" | |

INFORMATION PROCESSING DEVICE, INFORMATION PROCESSING METHOD, INFORMATION PROCESSING PROGRAM, AND RECORDING MEDIUM ON WHICH INFORMATION PROCESSING PROGRAM IS RECORDED

CROSS REFERENCE TO RELATED APPLICATIONS

This application is a National Stage of International Application No. PCT/JP2011/063921, filed on Jun. 17, 2011, the contents of all of which are incorporated herein by reference in their entirety.

TECHNICAL FIELD

The present invention relates to technical fields such as an information processing device that transmits the page data constituting a Web page over a network, in response to a request from a terminal device used by a user.

BACKGROUND ART

Shopping malls (virtual malls) that allow commercial transactions over the Internet have conventionally been known. A large number of shops (virtual shops) can be set up in such shopping malls. A Web page carrying a list of products being sold by respective shops (a Web page specially created for a campaign for some products, for example) is displayed on a terminal (hereinafter referred to as the "user terminal") used by a user (a customer) who has accessed a site providing a shopping mall (hereinafter referred to as the "shopping mall site") over the Internet. When the user selects a product (selects an image of a product, for example) on the Web page displayed on the user terminal, a Web page carrying detailed information about the selected product appears on the user terminal. Such a Web page carrying detailed information about a product is created by the shop that sells the product on the shopping mall site. The page data constituting the created Web page is then uploaded from a terminal used by the shop (hereinafter referred to as the "shop terminal") into a server managed by the site operator, for example. Patent Document 1 discloses a technique by which a product guide page (a Web page) for introducing products available at a shopping mall site over the internet is created by a shop terminal. Those products are selected from a group of products being actually traded at a real shop. The shop terminal uploads the product guide page to the shopping mall site.

CITATION LIST

Patent Document

Patent Document 1: Japanese Patent Application Laid-Open Publication No. 2003-85389

SUMMARY OF INVENTION

Technical Problem to be Solved by the Invention

The display contents of a Web page are used for advertising or promoting a product or the like, and therefore, it is preferable to make an improvement in the display contents so that the contents become appealing to users.

However, it might be difficult for a shop to modify the display contents of a Web page the shop has created. For example, in a case where shops are required to do programming such as creating scripts, those that cannot create scripts find it difficult to modify the display contents of their own Web pages. Even if a shop can create scripts, the shop needs to incorporate scripts into a changed Web page every time the layout of the Web page is changed, resulting in poor efficiency.

Meanwhile, a site operator also creates a Web page for a campaign, and the site operator might make an improvement in the display contents through a script. However, in a case where the layout of the Web page for a campaign is changed by the site operator, scripts need to be newly incorporated into the changed Web page, also resulting in poor efficiency.

The present invention has been made in view of the above circumstances, and aims to provide an information processing device that can efficiently make an improvement in a created Web page so that the display contents become appealing to users, and provide such an improved Web page to users. The present invention also aims to provide an information processing method, an information processing program, and a recording medium storing the information processing program.

Solutions to the Problems

In order to achieve the above described problems, an invention described in claim 1 is characterized in that in an information processing device that transmits page data constituting a Web page to a terminal device via a network, the information processing device comprises: a first acquiring means that acquires page data constituting a Web page for displaying predetermined content information, the Web page being created to be provided to the terminal device via the network; a second acquiring means that acquires a script from a storing means that stores the script, the script being programmed to allow reference to correspondence information associating candidate content information set beforehand as a candidate for content information to be displayed on the Web page with variation information specifying variations of at least a display form of an object to be displayed on the Web page, the script being for causing the terminal device to carry out: an object display step of displaying an object on the Web page; an identifying step of identifying, from the Web page, the content information displayed in a predetermined range on the Web page, the range being set beforehand based on a display position of the object on the Web page; a determining step of determining the variation information associated with the candidate content information corresponding to the identified content information by referring to the correspondence information; and a control step of changing at least the display form of the object displayed on the Web page, based on the determined variation information; an incorporating means that incorporates the script acquired by the second acquiring means, in an executable manner, into the page data acquired by the first acquiring means; and a transmitting means that transmits the page data having the script incorporated thereinto by the incorporating means, to the terminal device, in response to a request from the terminal device.

According to this invention, the information processing device is designed to acquire the page data of a Web page, incorporate the script into the acquired page data in an executable manner, and, in response to a request from the terminal device, transmit the page data of the Web page having the script incorporated thereinto to the terminal device. Accordingly, an improvement can be efficiently made in a Web page to be provided to users so that the display contents become appealing to the users, and the improved Web page can be provided to users.

An invention described in claim 2 is characterized in that the information processing device according to claim 1, further comprises an extracting means that extracts content information containing the candidate content information by analyzing the page data acquired by the first acquiring means, wherein the incorporating means incorporates information for making the content information extracted by the extracting means identifiable by the script.

According to this invention, the terminal device can promptly identify content information displayed in a range on the Web page in accordance with the script, with the range being set beforehand based on the display position of the object on the Web page.

An invention described in claim 3 is characterized in that the information processing device according to claim 1 or 2, wherein the object display step includes causing the display position of the object to shift with time; and the identifying step includes identifying, from the Web page, the content information displayed in the predetermined range, while the display position of the object is shifting.

According to this invention, while the display position of the object is shifting with time, at least the display form of the object displayed on the Web page can be changed based on the determined variation information. Accordingly, the content information can be more effectively made appealing to users.

An invention described in claim 4 is characterized in that the information processing device according to any one of claims 1 to 3, wherein the identifying step includes identifying, from the Web page, the content information having a distance equal to or shorter than a predetermined threshold value, the distance being a distance between first coordinates corresponding to the display position of the object and second coordinates determined beforehand among a group of coordinates contained in a display range of the content information on the Web page.

According to this invention, the content information with which the distance between the first coordinates and the second coordinates is equal to or shorter than the threshold value is identified from the Web page. Accordingly, the process for identifying content information can be simplified.

An invention described in claim 5 is characterized in that the information processing device according to any one of claims 1 to 3, wherein the identifying step includes identifying, from the Web page, the content information having a distance equal to or shorter than a predetermined threshold value, the distance being the shortest distance among distances between first coordinates corresponding to the display position of the object and a plurality of sets of second coordinates determined beforehand among a group of coordinates contained in a display range of the content information on the Web page.

According to this invention, the content information with which the shortest distance among the distances between the first coordinates and the sets of second coordinates is equal to or shorter than the threshold value is identified from the Web page. Accordingly, content information can be efficiently identified, regardless of the shape of the display region of the content information.

An invention described in claim 6 is characterized in that the information processing device according to claim 4 or 5, wherein the threshold value is set for each of a plurality of directions on the Web page, with the display position of the object being a base point, and the threshold value in a first direction among the directions is larger than the threshold value in a second direction among the directions, the second direction being different from the first direction.

According to this invention, the content information existing in the first direction (the travelling direction of the object, for example) can be prioritized over the content information existing in another direction in the identifying process, with the display position of the object being the base point.

An invention described in claim 7 is characterized in that the information processing device according to anyone of claims 1 to 3, wherein the range is set for each of a plurality of directions on the Web page, with the display position of the object being a base point, and the range in a first direction among the directions is larger than the range in a second direction among the directions, the second direction being different from the first direction.

According to this invention, the content information existing in the first direction (the travelling direction of the object, for example) can be prioritized over the content information existing in another direction in the identifying process, with the display position of the object being the base point.

An invention described in claim 8 is characterized in that the information processing device according to claim 1 or 2, wherein the object display step includes causing the display position of the object to shift outside a display range in which an image or a text is displayed on the Web page.

According to this invention, the display position of the object shifts outside the display range in which an image or a text is displayed on the Web page. Accordingly, a decrease in the visibility of the image or the text on the Web page can be prevented.

An invention described in claim 9 is characterized in that the information processing device according to any one of claims 1 to 8, wherein the correspondence information associating the variation information with each of a plurality of pieces of the candidate content information is stored in the storing means, the information processing device further comprises a narrowing-down means that narrows down the correspondence information stored in the storing means and corresponding to each piece of the candidate content information, to the correspondence information containing candidate content information corresponding to the content information extracted by the extracting means, and the transmitting means transmits the correspondence information narrowed down by the narrowing-down means, to the terminal device.

According to this invention, while the processing load of the terminal device is reduced, the content information displayed on the Web page at the terminal device can be more effectively made appealing to users.

An invention described in claim 10 is characterized in that the information processing device according to any one of claims 1 to 8, wherein the identifying step includes transmitting position information indicating a display position of the object on the Web page to the information processing device, and causing the information processing device to identify the content information based on the position information and the page data, and the determining step includes causing the information processing device to determine the variation information associated with the candidate content information corresponding to the identified content information.

According to this invention, the display positions of objects can be managed in the information processing device. Also, while the processing load of the terminal device can be reduced, the content information displayed on the Web page at the terminal device can be more effectively made appealing to users.

An invention described in claim 11 is characterized in that in an information processing method to be implemented by a computer that transmits page data constituting a Web page to a terminal device via a network, the information processing method comprises: the step of acquiring page data constituting a Web page for displaying predetermined content information, the Web page being created to be provided to the terminal device via the network; the step of acquiring a script from a storing means that stores the script, the script being programmed to allow reference to correspondence information associating candidate content information set beforehand as a candidate for content information to be displayed on the Web page with variation information specifying variations of at least a display form of an object to be displayed on the Web page, the script being for causing the terminal device to carry out: an object display step of displaying an object on the Web page; an identifying step of identifying, from the Web page, the content information displayed in a predetermined range on the Web page, the range being set beforehand based on a display position of the object on the Web page; a determining step of determining the variation information associated with the candidate content information corresponding to the identified content information by referring to the correspondence information; and a control step of changing at least the display form of the object displayed on the Web page, based on the determined variation information; the step of incorporating the acquired script, in an executable manner, into the acquired page data; and the step of transmitting the page data having the script incorporated thereinto, to the terminal device, in response to a request from the terminal device.

An invention of an information processing program described in claim 12 is characterized in that in the information processing program for a computer that transmits page data constituting a Web page to a terminal device via a network, the information processing program causes the computer to carry out: the step of acquiring page data constituting a Web page for displaying predetermined content information, the Web page being created to be provided to the terminal device via the network; the step of acquiring a script from a storing means that stores the script, the script being programmed to allow reference to correspondence information associating candidate content information set beforehand as a candidate for content information to be displayed on the Web page with variation information specifying variations of at least a display form of an object to be displayed on the Web page, the script being for causing the terminal device to carry out: an object display step of displaying an object on the Web page; an identifying step of identifying, from the Web page, the content information displayed in a predetermined range on the Web page, the range being set beforehand based on a display position of the object on the Web page; a determining step of determining the variation information associated with the candidate content information corresponding to the identified content information by referring to the correspondence information; and a control step of changing at least the display form of the object displayed on the Web page, based on the determined variation information; the step of incorporating the acquired script, in an executable manner, into the acquired page data; and the step of transmitting the page data having the script incorporated thereinto, to the terminal device, in response to a request from the terminal device.

An invention of a recording medium described in claim 13 is the recording medium storing an information processing program for a computer that transmits page data constituting a Web page to a terminal device via a network, the information processing program causes the computer to carry out: the step of acquiring page data constituting a Web page for displaying predetermined content information, the Web page being created to be provided to the terminal device via the network; the step of acquiring a script from a storing means that stores the script, the script being programmed to allow reference to correspondence information associating candidate content information set beforehand as a candidate for content information to be displayed on the Web page with variation information specifying variations of at least a display form of an object to be displayed on the Web page, the script being for causing the terminal device to carry out: an object display step of displaying an object on the Web page; an identifying step of identifying, from the Web page, the content information displayed in a predetermined range on the Web page, the range being set beforehand based on a display position of the object on the Web page; a determining step of determining the variation information associated with the candidate content information corresponding to the identified content information by referring to the correspondence information; and a control step of changing at least the display form of the object displayed on the Web page, based on the determined variation information; the step of incorporating the acquired script, in an executable manner, into the acquired page data; and the step of transmitting the page data having the script incorporated thereinto, to the terminal device, in response to a request from the terminal device.

Effects of the Invention

According to the present invention, the information processing device is designed to acquire the page data of a Web page, incorporate the script into the acquired page data in an executable manner, and, in response to a request from the terminal device, transmit the page data of the Web page having the script incorporated thereinto to the terminal device. Accordingly, an improvement can be efficiently made in a Web page to be provided to users so that the display contents become appealing to the users, and the improved Web page can be provided to users.

BRIEF DESCRIPTION OF THE DRAWINGS

FIG. 2 is a block diagram schematically showing an example structure of an information providing server 1 according to the first embodiment.

FIG. 3 is a diagram showing example correspondence information in the form of a table according to the first embodiment.

MODES FOR CARRYING OUT THE INVENTION

Next, modes for carrying out the present invention will be described, with reference to the accompanying drawings. The respective embodiments described below are embodiments incases where the present invention is applied to an information providing system.

(I) First Embodiment

First, referring to FIGS. 1 to 9, a first embodiment of the present invention is described.

Figure 1:
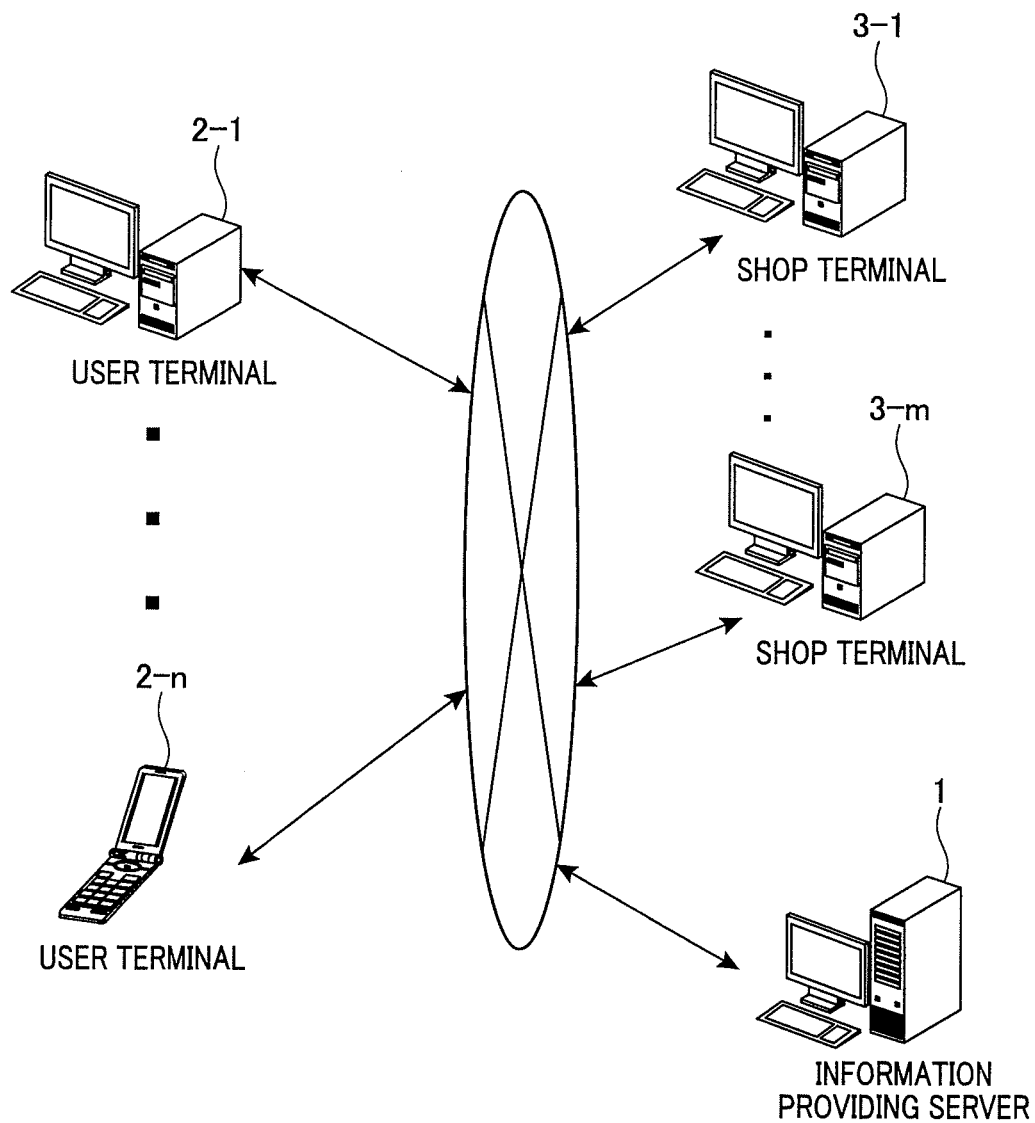
FIG. 1 is a diagram schematically showing an example structure of an information providing system S according to a first embodiment.

Referring first to FIG. 1, the structure and the outline of functions of an information providing system S according to the first embodiment of the present invention are described. FIG. 1 is a diagram schematically showing an example structure of an information providing system S according to the first embodiment.

As shown in FIG. 1, the information providing system S includes an information providing server 1, user terminals 2-$k$ (k=1, 2, n) (hereinafter referred to as "user terminals 2-$k$"), and shop terminals 3-$j$ (j=1, 2, . . . , m) (hereinafter referred to as "shop terminals 3-$j$"). It should be noted that the information providing server 1 is an example of the "information processing device" according to the present invention. Each user terminal 2-$k$ is an example of the "terminal device" according to the present invention.

The information providing server 1, the user terminals 2-$k$, and the shop terminals 3-$j$ can exchange data with one another via a network NW, using TCP/IP (Transmission Control Protocol/Internet Protocol) or the like as the communication protocol, for example. The network NW is formed with the Internet, a special-purpose communication line (such as a CATV (Community Antenna Television) line), a mobile communication network (including base stations and the like), a gateway, and the like, for example.

The information providing server 1 is a server (such as a Web server or a database server) that is installed for operating a shopping mall site (such as a virtual mall) or the like for respective shops and users to conduct commercial transactions of products and services over the network NW. In response to a request (a HTTP ((Hyper Text Transfer Protocol) request) from a user terminal 2-$k$ that has accessed the site, the information providing server 1 transmits page data constituting a Web page (hereinafter referred to as "page data of a Web page") to the user terminal 2-$k$. Based on the received page data, the user terminal 2-$k$ uses a Web browser to display the Web page on the display screen of a display unit (an active display region of the Web browser).

Here, examples of Web pages that are provided to the user terminal 2-$k$ include a Web page carrying a list of products being sold by the respective shops (a Web page for a promotional campaign for products) and a Web page carrying detailed information about a product. The Web page carrying a list of products being sold by the respective shops is created by the site operator (or by employees of the site operator), for example. Meanwhile, the Web page carrying detailed information about a product is created by the shop that sells the product (or by an employee of the shop), for example. On such Web pages, various kinds of content information about products are displayed. The content information contains images of products, characters (texts) introducing the products, and the like. Examples of Web pages that are created by site operators include a Web page carrying information for supporting recovery from an earthquake, a natural disaster, or the like, and a Web page specialized in information about Mother's Day.

Referring now to FIG. 2, the structure and functions of the information providing server 1 according to the first embodiment are described. FIG. 2 is a block diagram schematically showing an example structure of the information providing server 1 according to the first embodiment.

As shown in FIG. 2, the information providing server 1 includes a communication unit 11, a storage unit 12, an input/output interface unit 13, and a system control unit 14. The system control unit 14 and the input/output interface unit 13 are connected via a system bus 15.

The communication unit 11 is connected to the network NW, to control communication with a user terminal 2-$k$ or a shop terminal 3-$j$.

The storage unit 12 is formed with a hard disk drive, for example, and stores various kinds of programs such as an operating system and a server program (including the information processing program of the present invention). The various kinds of programs may be obtained from another server or the like via the network NW, or may be recorded in a recording medium and be read from the recording medium via a drive device.

Also, page data of various kinds of Web pages (Web pages for displaying predetermined content information) created to be provided to the user terminal 2-$k$ via the network NW is stored in the storage unit 12. The page data is formed with a structured Literature file described in HTML (Hyper Text Markup Language), XML (eXtensible Markup Language), XHTML (Extensible HyperText Markup Language), or the like (hereinafter referred to simply as the "Literature file"), an image file, and the like. The Literature file contains text data and the like constituting the content information. The image file contains image data and the like constituting the content information. The size, location, and the like of each piece of content information to be displayed on Web pages are defined in the Literature file.

Also, a DB (database) 121 is formed in the storage unit 12. This DB 121 stores a table showing correspondence information in which candidate content information is associated with action information (an example of variation information). Here, the candidate content information is determined beforehand as a candidate for the content information to be displayed on Web pages, by the site operator, for example. Examples of the candidate content information include information that attracts interest and attention from users viewing Web pages (such as information about special offers such as discounts, coupons, and the like), information that arouses the users' curiosity (such as information containing the names of counterfeit products), information for supporting recovery from an earthquake, a natural disaster, or the like. Meanwhile, the action information is a script that specifies at least variations of display forms of an object to be displayed on Web pages (a simplified program written in a script language such as JavaScript (a registered trade name)). This object is formed with an image in the shape of a person, for example. This object is designed to have a display position shifting on a Web page with time, in compliance with a movement simulating a walking movement of a person in accordance with the later described "script specifying an object display operation", for example. The shifting of the display position of an object on a Web page will be hereinafter referred to as the "moving display of an object". Also, through the action information, the user viewing the object on a Web page can see the object performing actions such as "jumping" and "raising arms up". In a case where more than one object is displayed on a Web page, the above described moving display is performed on each of the objects. The variations of display forms of objects include displaying a speech balloon showing a text from an object (an image in which an object uttering some kinds of words), for example. Although an object in the shape of a person is described as an example in this embodiment, objects are not limited to that, and each object may be in the shape of an animal, a vehicle, or the like.

The above described correspondence information is used by the "script that specifies the object display operation (hereinafter referred to as the "object display operation script")" to be performed by the Web browser of each user terminal 2-$k$, for example. The object display operation script is a script programmed to allow reference to the correspondence information, and is a script for causing the Web browser of each user terminal 2-$k$ to carry out: (i) an object display step of displaying an object on a Web page; (ii) an identifying step of identifying, from the Web page, content information displayed in a predetermined range on the Web page, the range (for example, around the object) being set beforehand based on the display position of the object on the Web page (or identifying the content information based on the relationship with the display position of the object); (iii) a determining step of determining the action information associated with the candidate content information corresponding to the identified content information, by referring to the correspondence information; and (iv) a control step of changing at least the display form of the object displayed on the Web page, based on the determined action information. Such an object display operation script is stored in the storage unit 12, and is incorporated, in an executable manner, into the page data of a Web page (or is written into the structured Literature forming the Web page) that is created by the shop or the site operator and is acquired by the information providing server 1 uploading the page data from a shop terminal 3-$j$ or a terminal being used by the site operator, for example.

Referring now to FIG. 3, the outline of an object display operation to be performed in accordance with the object display operation script is described. FIG. 3 is a diagram showing example correspondence information in the form of a table according to the first embodiment.

In the table T shown as an example in FIG. 3, correspondence information that associates candidate content information 50 with action information 51 of each object is registered. In this table T, more than one piece of candidate content information 50 is registered, and action information 51 is associated with each piece of candidate content information 50. In other words, in the example shown in FIG. 3, there is correspondence information about each piece of candidate content information 50. It should be noted that each row in the table T shown in FIG. 3 is referred to as a "record".

For example, in a case where an operation to display an object OB1 is performed, when the text "the greatest bargain" is contained in the content information identified from the relationship with the display position of the object OB1, the action information 51 that is the script for "jumping" associated with the candidate content information 50 indicating "the greatest bargain" is determined from the correspondence information in a record RD1 shown in FIG. 3. Based on the determined action information 51 that is a script for "jumping", the display form of the object OB1 displayed on the Web page is changed to "a person who is jumping". Through this operation, the content information CT1 displayed around the object OB1 can be more effectively made appealing to the viewer, and the information about the greatest bargain can be effectively conveyed to the viewer.

In a case where content information contains an image, the text shown in the image may be recognized with an OCR (Optical Character Reader) so that the text contained in the content information is identified. Meanwhile, there are cases where content information contains an image of a banner advertisement, for example, and such an image is changed to another image after a predetermined period of time. In the image switching, if the text shown in the image is also changed, for example, the action information 51 associated with the candidate content information 50 is also changed, as the text is changed (from "the greatest bargain" to "campaign", for example). Therefore, in this case, a variation of the display form of the object OB1 displayed on the Web page is changed to another variation, as the image is changed. For example, the variation of the display form of the object OB1 is switched from "jumping" to "raising arms up".

Also, in a case where an operation to display an object OB2 is performed, for example, when the text "Y % OFF" ("Y" in this case is an arbitrary natural number of 100 or smaller) is contained in the content information identified from the relationship with the display position of the object OB2, the action information 51 that is the script for "confetti" associated with the candidate content information 50 indicating "Y % OFF" is determined from the correspondence information in a record RD2 shown in FIG. 3. Based on the determined action information 51 that is a script for "confetti", the display form of the object OB1 displayed on the Web page is changed to "throwing confetti around a person". In the table T shown in FIG. 3, "X" and "Z" in the candidate content information 50 indicating "X times more points" and the candidate content information 50 indicating "for the first Z persons" are arbitrary natural numbers. Also, when the text "for the first Z persons" is contained in the content information identified from the relationship with the display position of the object OB2, the action information 51 that is the script for "beginning to run" associated with the candidate content information 50 indicating "for the first Z persons" is determined from the correspondence information in a record RD3 shown in FIG. 3. Based on the determined action information 51 that is a script for "beginning to run", the display form of the object OB2 displayed on the Web page is changed to "a walking person suddenly speeding up and beginning to run".

The design may be made to determine the action information 51 associated with the candidate content information 50 containing the content information. For example, in a case where only the text "great bargain" is contained in the content information, the text "great bargain" is contained in the candidate content information 50 indicating "the greatest bargain". Therefore, in this case the action information 51 that is the script for "jumping" associated with the candidate content information 50 indicating "the greatest bargain" is determined.

Also, in a case where an operation to display the object OB2 is performed, for example, when the text "relief goods" is contained in the content information identified from the relationship with the display position of the object OB2, the action information 51 that is the script for "supporting speech balloon" associated with the candidate content information 50 indicating "relief goods" is determined from the correspondence information in a record RD4 shown in FIG. 3. Based on the determined action information 51 that is a script for "supporting speech balloon", a speech balloon or the like is displayed near the object OB2 displayed on the Web page, and a message, "the relief goods you have kindly purchased will be sent to people in the affected area through respective local governments", is displayed in the speech balloon. Through this operation, the creator of the Web page can deliver a strong message that he/she is actively supporting recovery from an earthquake or the like, to the viewers.

Also, in a case where an operation to display the object OB2 is performed, for example, when the text indicating the name "ABCDEF" (similar to the name of a genuine product, for example) of a counterfeit product are contained in the content information identified from the relationship with the display position of the object OB2, the action information 51 that is the script for "warning speech balloon" associated with the candidate content information 50 indicating "ABCDEF" is determined from the correspondence information in a record RD5 shown in FIG. 3. Based on the determined action information 51 that is a script for "warning speech balloon", a speech balloon or the like is displayed near the object OB2 displayed on the Web page, and a message, "Please note that the products not underlined with two lines are counterfeit products. Meanwhile, we do not give any discount for genuine products." is displayed in the speech balloon. Through this operation, the creator of the Web page can warn the viewers against counterfeit products.

The input/output interface unit 13 is designed to perform an interfacing operation between the communication unit 11 and the storage unit 12, and the system control unit 14.

The system control unit 14 is formed with a CPU (Central Processing Unit) 14*a*, a ROM (Read Only Memory) 14*b*, a RAM (Random Access Memory) 14*c*, and the like. The storage unit 12 and the RAM (Random Access Memory) 14*c* are an example of the "storing means" according to the present invention. By executing the server program, the system control unit 14 functions as the first acquiring means, the second acquiring means, the incorporating means, the transmitting means, and the like of the present invention. With this arrangement, the system control unit 14 incorporates (writes) the object display operation script, in an executable manner, into page data obtained by receiving an upload of the page data of a Web page from a shop terminal 3-*j* or the like. The system control unit 14 then stores the page data containing the object display operation script into the storage unit 12 in a providable manner, and, in response to a request from a user terminal 2-*k*, transmits the stored page data of the Web page to the user terminal 2-*k* via the network NW.

Figure 4:
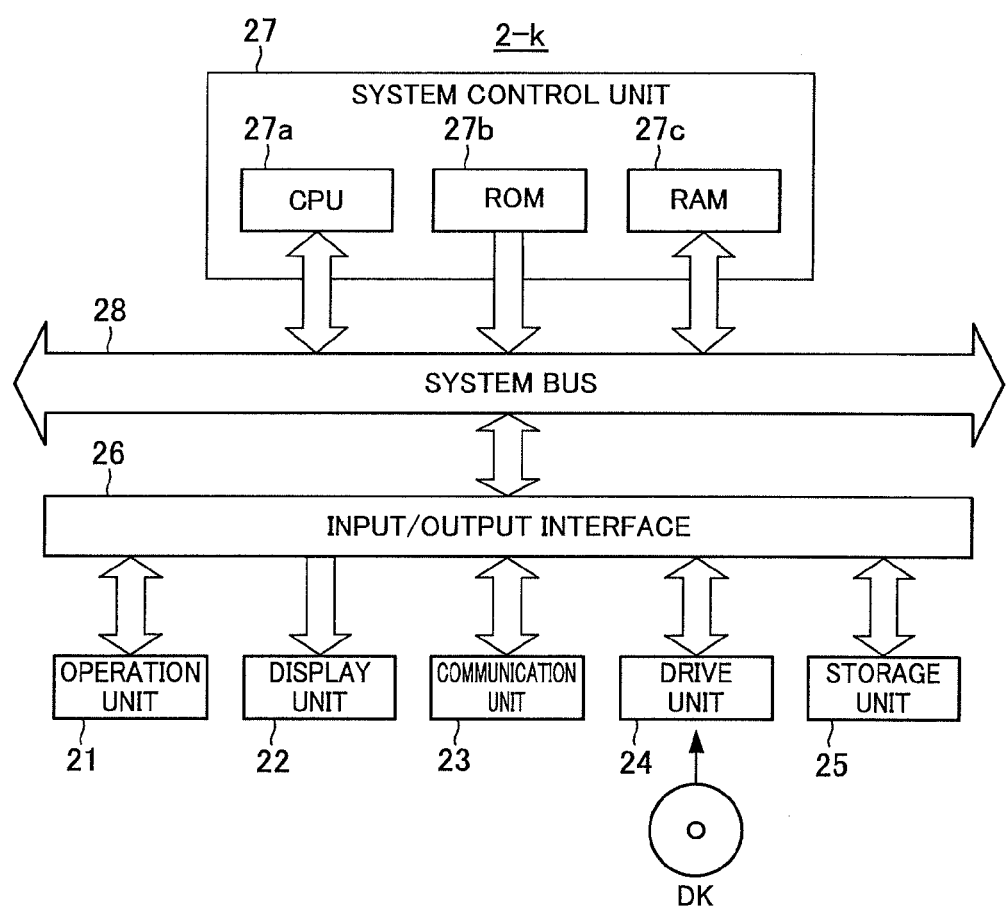
FIG. 4 is a block diagram schematically showing an example structure of a user terminal 2-k.

Referring now to FIG. 4, the structure and functions of each user terminal 2-*k* are described. FIG. 4 is a block diagram schematically showing an example structure of each user terminal 2-*k*. The structure of each shop terminal 3-*j* is the same as the structure of each user terminal 2-*k*, and therefore, explanation thereof is omitted herein.

As shown in FIG. 4, the user terminal 2-*k* includes an operation unit 21, a display unit 22, a communication unit 23, a drive unit 24, a storage unit 25, an input/output interface unit 26, and a system control unit 27. The system control unit 27 and the input/output interface unit 26 are connected via a system bus 28. The user terminal 2-*k* may be a personal computer, a PDA (Personal Digital Assistant), a portable telephone device, or the like.

The operation unit 21 includes a keyboard, a mouse, and the like. The display unit 22 includes a display for displaying a Web page or the like. The communication unit 23 controls communication with the information providing server 1 or the like by connecting to the network NW. The drive unit 24 reads data or the like from a disk DK (a recording medium) such as a CD (Compact Disc) or a DVD (Digital Versatile Disc), and records data or the like on the disk DK. The storage unit 25 is formed with a hard disk drive or the like, and stores an operating system (O/S), a Web browser program, and the like.

The system control unit 27 includes a CPU 27*a*, a ROM 27*b*, a RAM 27*c*, and the like. By executing the Web browser program while running the operating system, the system control unit 27 requests a Web page from the information providing server 1, and receives the page data of the Web page from the information providing server 1. The Web page is then displayed on the display screen of the display unit 22. The system control unit 27 then performs the above described object display operation in accordance with the object display operation script incorporated into the page data of the Web page.

Figure 5:
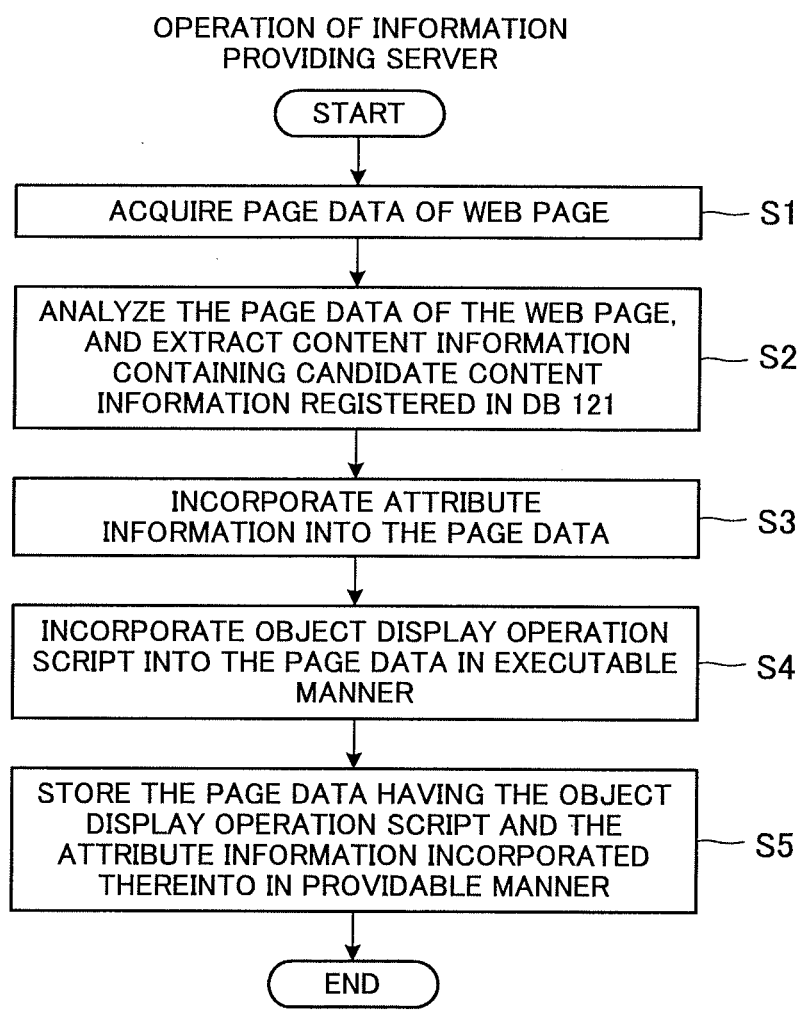
FIG. 5 is a flowchart showing a script incorporating operation according to the first embodiment.
Figure 6:
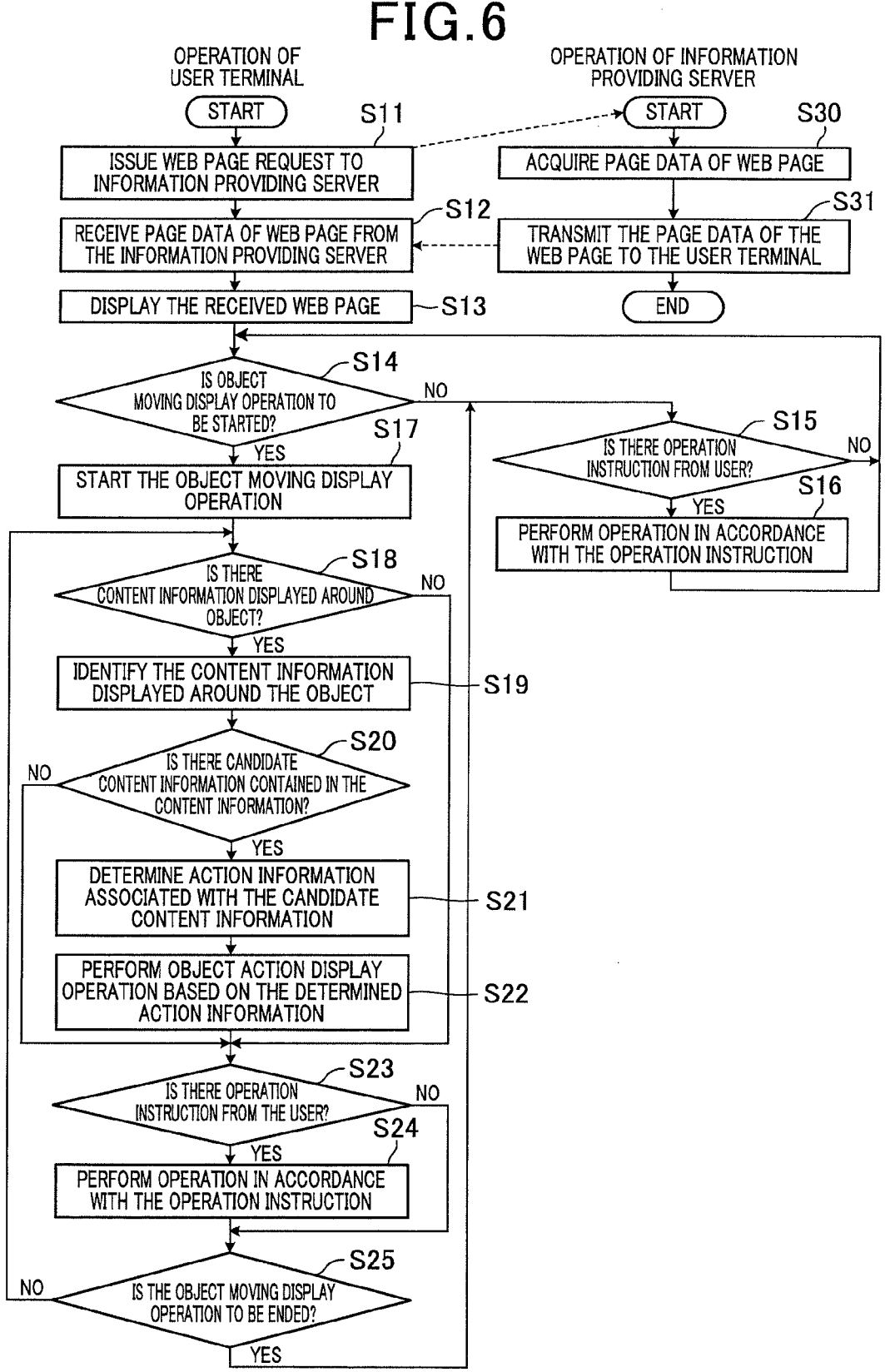
FIG. 6 is a flowchart showing a display operation according to the first embodiment.
Figure 7:
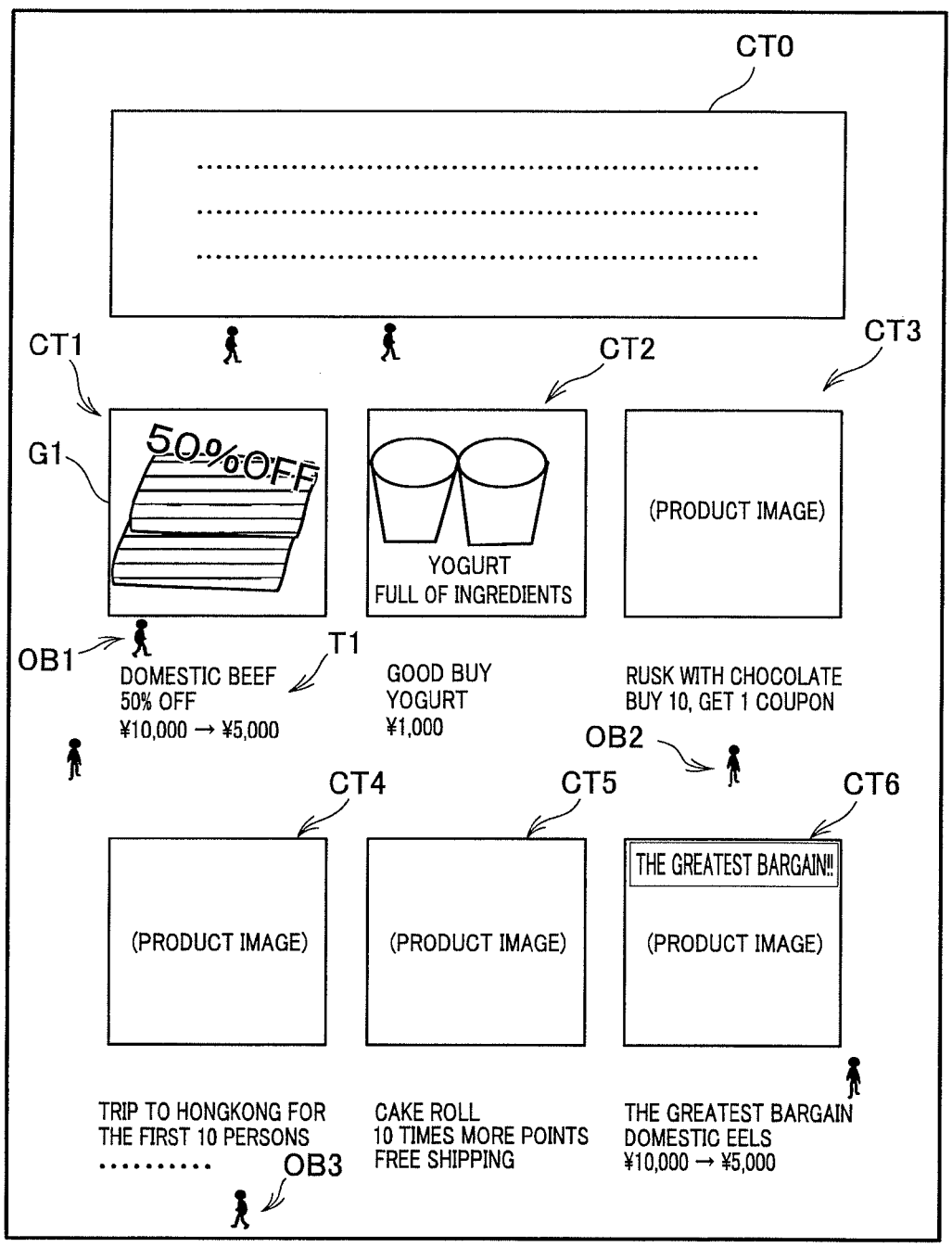
FIG. 7 is a diagram showing objects and content information displayed on a Web page.
Figure 9A:
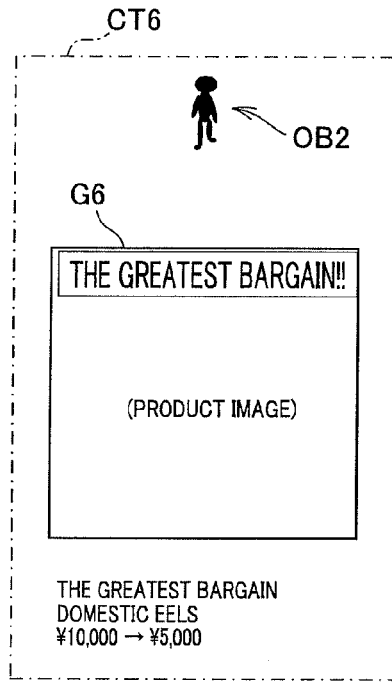
FIG. 9 are conceptual diagrams for explaining a method of determining whether the distance between the coordinates corresponding to the display position of an object and the reference coordinates of the content information is equal to or shorter than a threshold value.
Figure 9B:
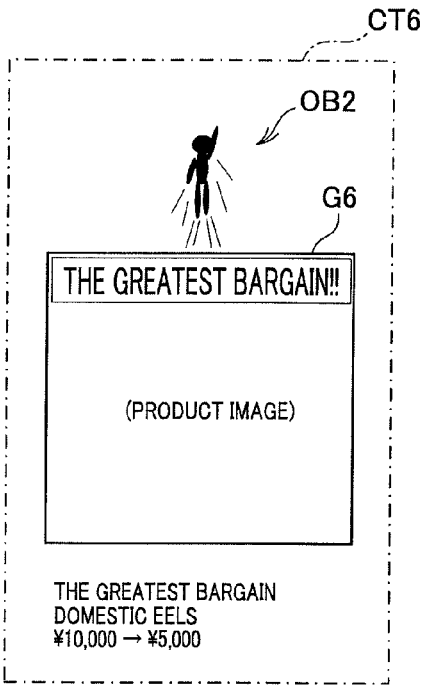
Figure 9C:
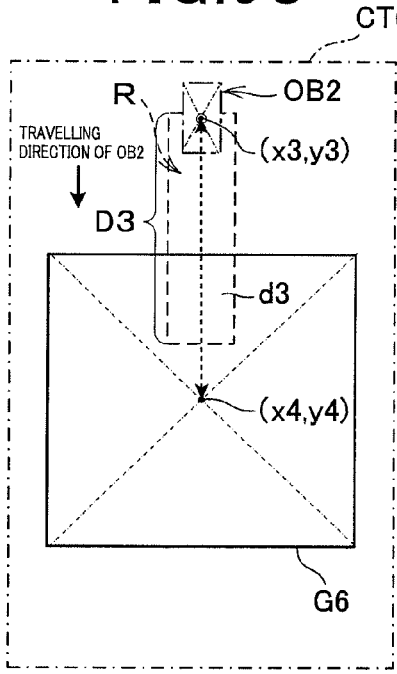
Figure 9D:
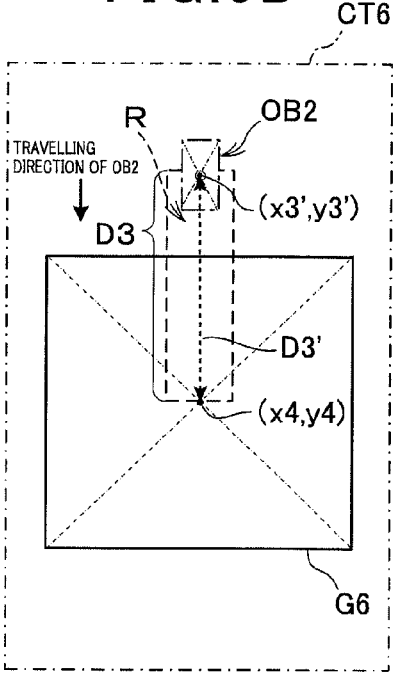
Figure 10:
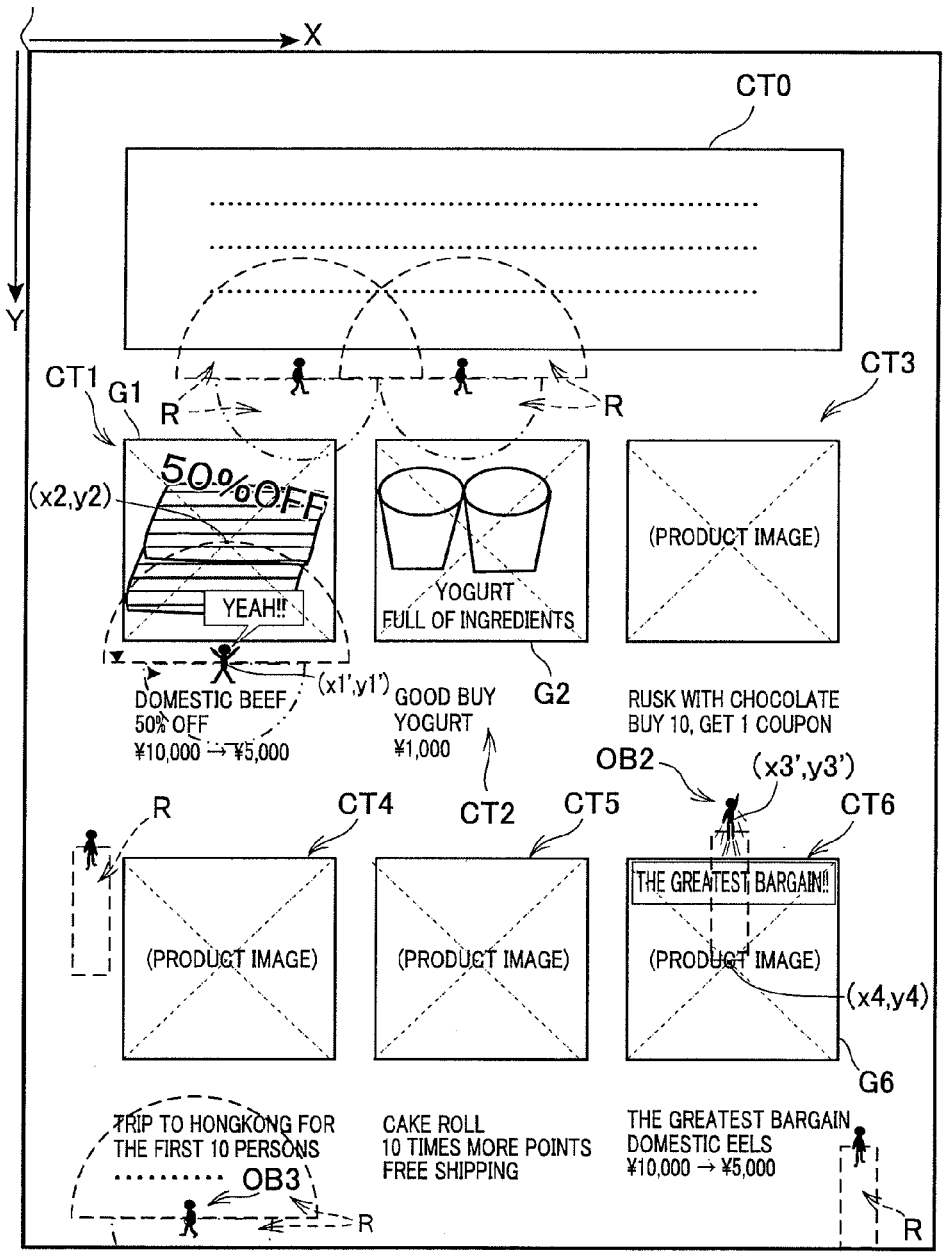
FIG. 10 is a diagram showing objects and content information displayed on a Web page.

Referring now to FIGS. 5 to 12, operations of the information providing system S according to the first embodiment are described. FIG. 5 is a flowchart showing a script incorporating operation according to the first embodiment. FIG. 6 is a flowchart showing a display operation according to the first embodiment. FIGS. 7 and 10 are diagrams each showing objects and content information displayed on a Web page. FIGS. 8 and 9 are conceptual diagrams for explaining a method of determining whether the distance between the coordinates corresponding to the display position of an object and the reference coordinates of the content information is equal to or shorter than a threshold value.

Referring first to FIG. 5, the script incorporating operation to be performed by the information providing server 1 is described.

The script incorporating operation shown in FIG. 5 is started when an upload request is received from a shop terminal 3-*j* after the corresponding shop is authenticated through a login process (an operation to authenticate the shop by using a shop ID, for example) performed for the shop owning the shop terminal 3-*j* that has accessed the information providing server 1.

In step S1 shown in FIG. 5, the system control unit 14 of the information providing server 1 receives and acquires an upload of the page data of a Web page in response to an upload request from a shop terminal 3-*j* (step S1). That is, the system control unit 14 receives, via the communication unit 11, the page data transmitted from the shop terminal 3-*j* via the network NW.

The page data of the Web page acquired in step S1 is then analyzed, and the content information containing candidate content information registered in the DB 121 is extracted (step S2). The system control unit 14 in this case functions as the "extracting means" according to the present invention. For example, after acquiring text data as a search result by conducting a full-text search in the structured Literature related to the page data, the system control unit 14 refers to the candidate content information registered in the DB 121, and determines whether the text data containing the candidate content information is contained in the search result. Here, in a case where an image file name is written in the structured Literature, text data is obtained as a search result, as the text shown in the image identified from the image file name is recognized with an OCR. If the system control unit 14 determines that the text data containing the candidate content information (or the text data containing part of the candidate content information) is contained in the search result, the content information containing the text data is extracted. At this point, the above described correspondence information is obtained from the table T stored in the DB 121, and is incorporated into the page data in such a manner that the correspondence information can be referred to through the object display operation script (or is incorporated into the object display operation script, for example). Ina case where the page data of the Web page acquired in step S1 is formed with a HTML Literature, for example, the Javascript (a registered trade name) description, <SCRIPT type="text/Javascript" src="./xxxxx.js"></SCRIPT>, is added to the HTML Literature. Here, "xxxxx.js" is the information for identifying the script to be used (written in Javascript (a registered trade name)).

The system control unit 14 then incorporates attribute information (an eye-catching mark, for example) for making the content information extracted in step S2 identifiable by the object display operation script, into the page data of the Web page acquired in step S1 (step S3). For example, the system control unit 14 adds a name attribute value (<span name="content"> or <div name="content">, for example) as the attribute information to the span tag (<span> content information </span>) or the div tag (<div> content information (20% OFF, for example)</div>) specifying the extracted content information. In this manner, the attribute information is incorporated into the page data. Here, the span tag is an in-line element, does not entail a linefeed therebefore and thereafter, and can be identified as an in-line. On the other hand, the div tag is a block element, and entails a linefeed therebefore and thereafter (that is, when displayed by a Web browser, <div> elements are separated by a linefeed). Therefore, the span tag is preferred in this embodiment.

In a case where the extracted content information is not specified with a span tag or a div tag, the extracted content information may be surrounded by <span name="content"> and </span> (or <div name="content"> and </div>), to incorporate the attribute information into the page data. Also, in a case where text data is obtained as the text shown in the image identified from the image file name are recognized with an OCR as described above, the text data may be written in a hidden fashion in the span tag specifying the content information. The above mentioned name="content" is an example of the attribute information, and any other attribute information for identification by the object display operation script may be used.

The system control unit 14 then acquires the object display operation script from the storage unit 12, and incorporates the object display operation script, in an executable manner, into the page data having the attribute information incorporated thereinto in step S3 (step S4). Alternatively, after incorporating the object display operation script, in an executable manner, into the page data acquired in step S1, the system control unit 14 may incorporate the attribute information into the page data in step S3.

The system control unit 14 then stores the page data having the object display operation script and the attribute information incorporated thereinto, into the storage unit 12 in a providable manner (step S5). In this manner, the page data having the object display operation script and the attribute information incorporated thereinto is linked to the page data of a Web page carrying a product list created by the site operator, for example.

As described above, in the first embodiment, the operation to extract the content information containing the candidate content information registered in the DB 121 is performed when the page data of a Web page is uploaded. Accordingly, the processing load can be made smaller than in a case where the extracting operation is performed when a Web page request is issued from a user terminal 2-$k$.

The script incorporating operation shown in FIG. 5 can also be performed on the page data of a Web page that is created by the site operator and is uploaded from a terminal being used by the site operator. In the case of a Web page created by the site operator, not only the page data of the created Web page (a campaign page or the like) is uploaded from a terminal being used by the site operator, but also the information providing server 1 can acquire the page data from the storing means that stores the page data in a predetermined manner.

Referring now to FIG. 6, a display operation to be performed by the information providing server 1 and a user terminal 2-$k$ is described.

The display operation shown in FIG. 6 is started by issuing an operation instruction to request a Web page (by designating the URL of a shopping mall site, for example) through an operation of the operation unit 21 by the user of the user terminal 2-$k$ after activation of the Web browser program. In step S11 shown in FIG. 6, the system control unit 27 of the user terminal 2-$k$ issues a Web page request (transmits a HTTP request) to the information providing server 1. When the information providing server 1 receives the Web page request, the system control unit 14 of the information providing server 1 acquires the page data of the requested Web site (a Web page carrying a list of products being sold by respective shops, for example) from the storage unit 12 (step S30). The above described correspondence information may be incorporated into the page data (into the object display operation script, for example) not in step S3 but in step S30.

The system control unit 14 of the information providing server 1 then transmits the page data of the Web page acquired in step S30 to the user terminal 2-$k$ that has transmitted the request for the Web page (step S31).

As a result, the system control unit 27 of the user terminal 2-$k$ receives the page data transmitted from the information providing server 1 (step S12). This page data is stored into a predetermined region in the RAM 27$c$. Based on the page data, the Web page is displayed on the display screen of the display unit 22 by the Web browser, and execution of the object display operation script incorporated into the page data is started (step S13). As a result, the system control unit 27 identifies all the content information displayed on the Web page from the page data, based on the above described attribute information (name="content", for example). The set of the text data contained in the identified content information and the reference coordinates on the Web page displaying the content information is acquired, and is stored into a predetermined region in the RAM 27$c$. The coordinates (x, y) of the content information set on the Web page can be acquired, based on the position properties (top: Xpx, left: Ypx) written in the structured Literature, for example. The reference coordinates of the content information will be described later in detail.

Referring now to FIG. 7, the Web page displayed here is described through an example. This Web page is a Web page carrying a list of products being sold by respective shops. Content information CT0 to CT6 shown in FIG. 7 are displayed on this Web page. In the example illustrated in FIG. 7, the content information CT1 to CT6 contains product images and texts (sentences) briefly introducing the products. For example, the content information CT1 shown in FIG. 7 is formed with a product image G1 and a text T1 briefly introducing the product, and the product image G1 (having its image file name designated with a <img> tag) and the text T1 are associated with each other in the page data. A link (URL) to a Web page carrying detailed information about the corresponding product (a Web page created by the shop that sells the corresponding product) is put in at least one of the product image G1 and the text T1. Accordingly, when the user of the user terminal 2-*k* designates (or clicks with a mouse) the product image G1 or the text T1 by operating the operation unit 21, the page data of the Web page carrying the detailed information about the product is transmitted from the information providing server 1 to the user terminal 2-*k* by a hyperlink, and the above described procedures of step S12 and the later steps are carried out on this page data.

The coordinates corresponding to the display position of the product image G on the Web page, and the coordinates corresponding to the display position of the text T1 briefly introducing the product on the Web page can be acquired by the Web browser. Coordinates on a Web page are expressed with pixels. For example, the upper left coordinates in an entire Web page are the origin (x0, y0), and the distance from the origin is expressed as (X, Y). The method of acquiring coordinates on a Web page is a known method, and therefore, is not described herein.

There are cases where a text such as "the greatest bargain" contained in the candidate content information 50 in the above described correspondence information is contained as part of the text contained in each piece of content information CT1 to CT6. On the other hand, there are cases where part of a text contained in the candidate content information 50 is contained in the content information CT1 to CT6 or the like.

The Web page shown in FIG. 7 also displays objects OB1 to OB3 and the likes. In the following description, the objects OB1 to OB3 will be also collectively referred to simply as the "object OB1 and (or) the like". The object OB1 and the like are moved and displayed on the Web page in accordance with the object display operation script incorporated into the page data that is received from the information providing server 1 in step S12. During the moving display, the respective images forming the object OB1 and the like are changed with the lapse of time, so that each of the object OB1 and the like is displayed in the form of a walking person. In the execution of this script, various kinds of data, such as coordinate data (such as the coordinates corresponding to the initial position), orientation data, and velocity data, are referred to. The various kinds of data are required for the moving display and are defined in a setting file contained in the page data, for example. In this setting file, the various kinds of data are defined so that the objects OB1 to OB3 and the likes are moved and displayed outside the display ranges (regions) in which the product images and the texts briefly introducing the products in the content information CT0 to CT6 are displayed. The coordinates corresponding to the display position of each of the objects OB1 to OB3 and the likes on a Web page (the respective coordinates during the moving display) can be obtained by the Web browser.

In a case where more than one of the object OB1 and the like is displayed on a Web page, the procedures of steps S14 and S17 to S25, which will be described later, are performed for each of the object OB1 and the like. Also, the procedures of steps S14 and S17 to S25 are repeatedly carried out for each of the object OB1 and the like at predetermined time intervals.

In step S14, the system control unit 27 of the user terminal 2-*k* determines whether to start a moving display operation to move and display each of the object OB1 and the like. In the determination in step S14, the system control unit 27 may determine that the moving display operation is to be started at the same time as a start of display of the Web page, or may determine that the moving display operation is to be started by the user operating the operation unit 21 (clicking the mouse at a predetermined spot on the Web page, for example) to issue an instruction (in some cases, the moving display operation is resumed after the moving display of the object OB1 or the like is temporarily ended). In a case where the moving display operation is determined not to be started in step S14 (NO in step S14), the system control unit 27 determines whether there is any operation instruction from the user through the operation unit 21 (step S15). In a case where there is an operation instruction (YES in step S15), the system control unit 27 performs an operation in accordance with the operation instruction (step S16), and then moves on to the above described procedure of step S14. Here, the operation performed in step S15 in accordance with the operation instruction may be a scrolling operation to be performed in a case where a scrolling instruction for scrolling through the Web page is issued, or a display operation to display another Web page designated by a link in a case where the link is designated in the Web page, or an ending operation to be performed in a case where an ending instruction for ending the display of the Web page is issued, for example. In a case where there are no operation instructions in step S15 (NO in step S15), the system control unit 27 also moves on to the above described procedure of step S14.

In a case where the moving display operation for the object OB1 and the like is determined to be started in step S14 (YES in step S14), on the other hand, the system control unit 27 starts the moving display operation for each of the object OB1 and the like (step S17). Through this operation, the display positions of the object OB1 and the like start to shift in the regions on the Web page outside the display ranges in which the product images and the texts briefly introducing the products in the respective pieces of content information CT0 to CT6 are displayed, as shown in the example illustrated in FIG. 7.

Here, in the example illustrated in FIG. 7, the object OB1 starts moving rightward in the region located between the product image G1 and the text T1 briefly introducing the product in the content information CT1 in FIG. 7. Also, the object OB2 starts moving downward in the region located above the content information CT6 in FIG. 7, from the content information CT3 toward the content information CT6, for example. Further, the object OB3 starts moving leftward in the region located below the content information CT4 in FIG. 7, for example.

As the moving display of each of the object OB1 and the like is started, the system control unit 27 determines whether there is the content information CT1 or the like displayed around the object OB1 or the like being moved and displayed (step S18). That is, based on the display positions of the object OB1 and the like on the Web page, the system control unit 27 determines whether the content information CT1 or the like is displayed in predetermined ranges on the Web page (by using the reference coordinates of content information acquired in step S13, for example). This determination method in step S18 will be described later in detail. In the following description, the content information CT1 to CT6 will be collectively referred to simply as the "content information CT1 and (or) the like".

In a case where it is determined in step S18 that the content information CT1 or the like does not exist around the object OB1 and the like being moved and displayed (NO in step S18), the system control unit 27 moves on to the procedure of step S23. In a case where it is determined in step S18 that the content information CT1 or the like exists around the object OB1 or the like being moved and displayed (YES in step S18), on the other hand, the system control unit 27 identifies the content information CT1 or the like displayed around the object OB1 or the like from the Web page (step S19). That is, while the object OB1 or the like are being moved and displayed, the content information CT1 or the like displayed around the object OB1 or the like is identified. In a case where the content information CT1 or the like is identified through the procedure of step S19, the system control unit 27 refers to the correspondence information contained in the page data stored in the RAM 27c, and determines whether any piece of candidate content information 50 is contained in the content information CT1 or the like identified in step S19 (or whether candidate content information 50 is contained in the text data contained in the identified content information CT1 or the like) (step S20). In step S20, a check may be made to determine whether the identified content information CT1 or the like is contained as part of any piece of the candidate content information 50. In a case where it is determined in step S20 that any piece of the candidate content information 50 is not contained in the identified content information CT1 or the like (NO in step S20), the system control unit 27 moves on to the procedure of step S23. In a case where it is determined in step S20 that some of the candidate content information 50 is contained in the identified content information CT1 or the like (YES in step S20), on the other hand, the system control unit 27 refers to the correspondence information, and determines the action information 51 associated with the candidate content information 50 contained in the content information CT1 or the like (or the action information 51 associated with the candidate content information corresponding to the identified content information CT1 or the like) (step S21). Based on the script written as the determined action information 51, the system control unit 27 executes an action display operation to change the display forms of the object OB1 or the like (step S22).

The system control unit 27 then determines whether there is any operation instruction from the user through the operation unit 21 as in step S15 (step S23). In a case where there is an operation instruction (YES in step S23), the system control unit 27 performs an operation in accordance with the operation instruction (step S24), and then moves on to the later described procedure of step S25. In a case where it is determined in step S23 that there are no operation instructions (NO in step S23), on the other hand, the system control unit 27 determines whether to end the moving display operation for the object OB1 or the like (step S25). In this determination in step S25, the system control unit 27 may determine that the moving display operation for the object OB1 or the like is to be ended in accordance with an operation instruction from the user through the operation unit 21, or may determine that the moving display operation for the object OB1 or the like is to be ended when the moving through a moving route preset in the object display operation script or the setting file has been completed, for example.

In a case where it is determined in step S25 that the moving display operation is not to be ended (NO in step S25), the system control unit 27 moves on to the procedure of step S18. In a case where it is determined in step S25 that the moving display operation is to be ended (YES in step S25), the system control unit 27 moves on to the procedure of step S15.

Referring now to FIGS. 7 to 12, the procedures of steps S18 to S22 are described in greater detail.

First, the procedures of steps S18 to S22 to be carried out for the object OB1 shown in FIGS. 7 and 8 are described in greater detail.

Figure 8A:
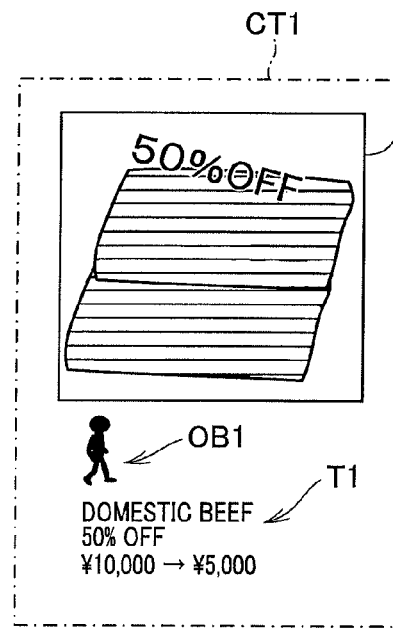
FIG. 8 are conceptual diagrams for explaining a method of determining whether the distance between the coordinates corresponding to the display position of an object and the reference coordinates of the content information is equal to or shorter than a threshold value.
Figure 8B:
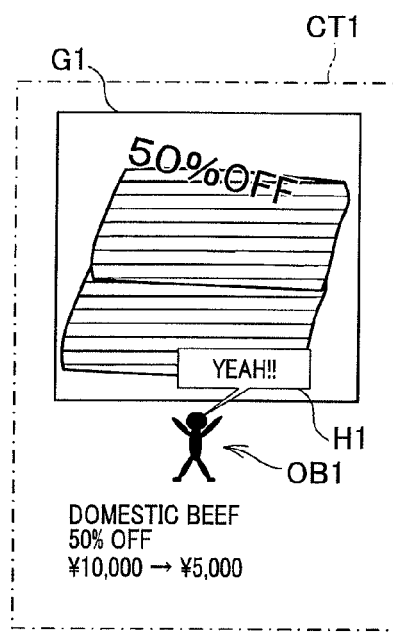

In the examples shown in FIGS. 7 and 8A, the object OB1 moves rightward in the region located between the product image G1 and the text T1 briefly introducing the product in the content information CT1 indicated by dot-and-dash lines in FIG. 8. Here, in the object display operation script, the predetermined ranges based on the display position of the object OB1 on the Web page are specified (though the ranges are identified from predetermined threshold values) in accordance with the traveling direction (the moving direction) of the object OB1 on the Web page. The display position of the object OB1 on the Web page is the center position of the image of the object OB1. In the case of the object OB1 having the moving display positions shown in FIG. 8, the two ranges R shown in FIG. 8C are selected (set) as the ranges preset with respect to the rightward direction, which is the travelling direction. Specifically, as shown in FIG. 8C, the ranges preset with respect to the rightward direction, which is the travelling direction, are the semicircular range R (indicated by the dashed line in FIG. 8C) that has its center in the position represented by the coordinates (x1, y1) (an example of the first coordinates) corresponding to the display position of the object OB1, and has a radius D1 (a threshold value), and the semicircular range R (indicated by the double-dot-and-dash line in FIG. 8C) having a radius D2, which is shorter than the radius D1. As described above, the ranges R (or the threshold values) are determined in respective directions (the upward direction and the downward direction in this case) on the Web page, with the base point being the display position of the object OB1. The range R (or the threshold value D1) in the upward direction (the first direction) is larger than the range R (or the threshold value D2) in the downward direction (the second direction). The respective ranges R in the upward and downward directions of the object OB1 are specified beforehand as an example of the ranges R selected in a case where the object OB1 or the like moves in the rightward and leftward directions on the Web page.

Figure 8C:
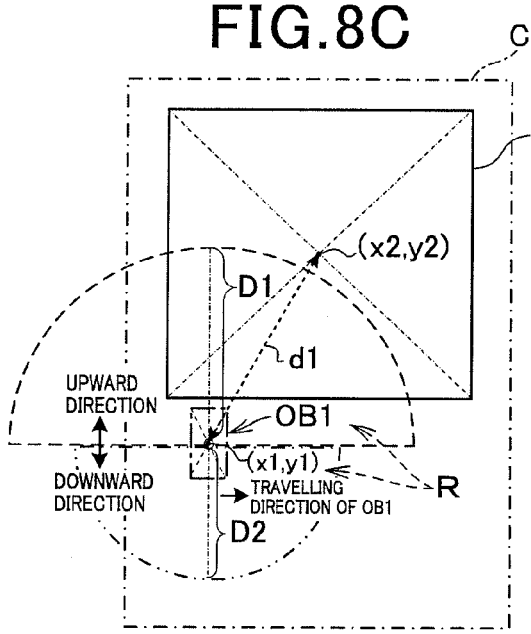

The reason that the two ranges R shown in FIG. 8C are selected as an example in a case where the object OB1 or the like is displayed on the Web page and is moved in the rightward and leftward directions is now described. In a case where the respective pieces of content information CT1 and the like are arranged in a grid formed with rows and columns on the Web page as shown in FIG. 7, when the display form of the object OB1 being moved and displayed on the Web page is changed, the moving route of the object OB1 or the like on the Web page is set within a range outside the display range in which the content information CT1 or the like is displayed on the Web page (or within a range surrounding the content information CT), so as to effectively achieve a visual effect to make the content information CT1 or the like appealing to the user. Therefore, as for the object OB1 or the like being displayed and moved in the rightward and leftward directions on the Web page, such ranges R as to facilitate identification of the content information CT1 or the like existing above or below the moving route should be specified, so that the content information CT1 or the like can be readily identified. When the same ranges R are specified in the upward direction and the downward direction, the later described reference coordinates of the content information CT1 and the like might coexist in the ranges R, which is not preferable. Therefore, to prioritize the content information CT1 or the like located above the moving route of the object OB1 or the like over the content information CT1 or the like located below the moving route, the two ranges R shown in FIG. 8C, which are the two ranges R in which the radius D1 of the range R in the upward direction is longer than the radius D2 of the range R in the downward direction, are specified as the ranges R in a case where the object OB1 or the like moves in the rightward and leftward directions. In a case where the content information CT1 or the like located below the moving route of the object OB1 or the like is prioritized over the content information CT1 or the like located above the moving route, two ranges R should be specified so that the radius D1 of the range R in the upward direction is shorter than the radius D2 of the range R in the downward direction, which is the opposite of the case shown in FIG. 8C.

In the procedure of step S18, a check is made to determine whether the distance (represented by the number of points (the number of pixels), for example) between the coordinates (x1, y1) corresponding to the display position of the object OB1 and the reference coordinates (an example of the second coordinates) of each piece of content information CT1 and the like is equal to or shorter than the threshold value D1 or D2 (represented by the number of points (the number of pixels), for example) (or whether the positional relationship between the object OB1 and the content information CT1 has been changed to a predetermined number of points), and the content information CT1 equal to or smaller than the threshold value D1 or D2 is identified from the Web page. The reference coordinates of each piece of the content information CT1 and the like are coordinates that are determined beforehand among the group of coordinates contained in the display ranges of the content information CT1 and the like on the Web page (such as the region in which the product image G1 and the text T1 briefly introducing the product are displayed), for example. In the example shown in FIG. 8C, the coordinates (x2, y2) corresponding to the center position (the center point) of the product image G1 are the reference coordinates. Alternatively, the reference coordinates may be the coordinates corresponding to the position at one corner (edge) on the outer periphery of the product image G1 or an arbitrary position on the outer periphery of the product image G1. Here, an example of the arbitrary position on the outer periphery of the product image G1 may be the position at the center of a vertical side (the left end or the right end) or at the center of a horizontal side (the upper end or the lower end) in a case where the image G1 has a rectangular shape, or may be the intersection points (four points) between the cross lines extending through the center of a circle in a case where the image has a circular shape. Alternatively, the reference coordinates may be the coordinates corresponding to the center position (the center point) of the entire content information CT1 including the product image G1 and the text T1 (the region surrounded by a dot-and-dash line in each of FIG. 8), the position at a corner on the outer periphery of the entire content information CT1, or an arbitrary position on the outer periphery of the entire content information CT1. Alternatively, in the above described Literature file, the reference coordinates of the content information CT1 and the like may be written in the tags for writing the text data constituting the content information CT1 and the like.

Figure 8D:
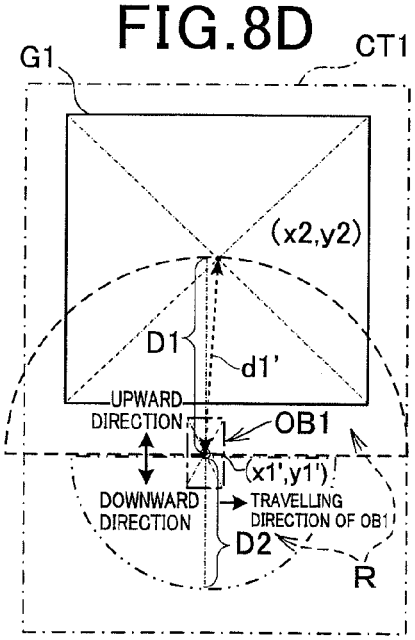

In the example case shown in FIG. 8C, a check is made to determine whether the distance d1 (=the number of points represented by the square root of the sum of $(x2-x1)^2$ and $(y2-y1)^2$) between the coordinates (x1, y1) corresponding to the display position of the object OB1 and the reference coordinates (x2, y2) of the content information CT1 is equal to or shorter than the threshold value D1 or D2. With the display position of the object OB1 in this case, the distance is determined not yet to be equal to or shorter than the threshold values D1 and D2. Therefore, the action display operation to change the display form of the object OB1 is not performed. Meanwhile, the object OB1 shown in FIG. 8 is displayed and moved in the rightward direction in FIG. 8. After a predetermined period of time, the object OB1 reaches the display position shown in FIG. 8B. As a result, the distance d1' between the coordinates (x1', y1') corresponding to the display position of the object OB1 and the reference coordinates (x2, y2) of the content information CT1 is determined to be equal to or shorter than the threshold value D1 (or the reference coordinates (x2, y2) of the content information CT1 are determined to be in the range R of the object OB1 in the upward direction), as shown in FIG. 8D. Accordingly, the content information CT1 is determined to be displayed around the object OB1 (YES in step S18 shown in FIG. 6). In this manner, the content information CT1 displayed around the object OB1 is identified from the Web page (step S19 shown in FIG. 6). For example, the identification is performed by using the identification information or the like for identifying the content information CT1. Since the content information CT1 shown in FIG. 8B contains the text "50% OFF", the action information 51 that is the script for "raising arms up" associated with the candidate content information 50 indicating "Y % OFF" is determined from the correspondence information shown in FIG. 3, for example (step S21 shown in FIG. 6). Based on the determined action information 51 that is the script for "raising arms up", the display form of the object OB1 is changed to "a person raising his/her arms up" (further accompanied by a speech balloon H1 containing the text "yeah!!"), as shown in FIG. 8B (step S22 shown in FIG. 6).

Next, the procedures of steps S18 to S22 to be carried out for the object OB2 shown in FIGS. 7 and 9 are described in greater detail.

In the example shown in FIG. 7 and FIG. 9A, the object OB2 is moving downward, from the content information CT3 toward the content information CT6, in a region located above the product image G6 of the content information CT6 indicated by the dot-and-dash lines in FIG. 9. In the case of the object OB2 having the moving display positions shown in FIG. 9, the rectangular range R shown in FIG. 9C is selected (set) as the range that is preset with respect to the travelling direction. Specifically, where the coordinates (x3, y3) (an example of the first coordinates) corresponding to the display position of the object OB2 serve as the base point and the center point of the upper short side, the rectangular range R having a long side length D3 (a threshold value) in the downward direction, which is the travelling direction, is a range extending in the downward direction as the travelling direction, as shown in FIG. 9C. As described above, the range R (or the threshold value) is determined in respective directions (the four directions of the upward, downward, rightward, and leftward directions in this case) on the Web page, with the base point being the display position of the object OB2. The range R (or the threshold value D3) in the travelling direction (the first direction) is larger than the range (or a threshold value) in any other direction (the second direction). This range R of the object OB2 is specified beforehand as an example of the range R that is selected in a case where the object OB2 moves in a travelling direction on the Web page.

The reason that the range R shown in FIG. 9C is selected as an example in a case where the object OB2 or the like is displayed on a Web page and is moved in a travelling direction is now described. In a case where the object OB2 or the like moves on a Web page, the user who is viewing the object OB2 or the like tends to look in the travelling direction, and it is considered that the user is likely to be interested in the content information CT1 or the like existing in the travelling direction. Therefore, the content information CT6 or the like existing in the travelling direction when viewed from the object OB2 or the like is prioritized in the identifying process over the content information CT1 or the like existing in another direction, so as to effectively achieve a visual effect to make the content information CT6 or the like appealing to the user. Meanwhile, if the same ranges R (the same threshold values) are specified in the four directions of the upward, downward, rightward, and leftward directions when viewed from the object OB2 or the like, the reference coordinates of the content information CT1 and the like might coexist in the ranges R as in the case described with reference to FIG. 8. Such a case is not preferable. Therefore, to prioritize the content information CT6 or the like existing in the traveling direction of the object OB2 or the like over the content information CT1 or the like existing in some other direction, the range R is made longer in the travelling direction of the object OB2 as shown in FIG. 9C.

In the procedure of step S18, a check is made to determine whether the distance (represented by the number of points (the number of pixels)) between the coordinates (x3, y3) corresponding to the display position of the object OB2 and the reference coordinates (an example of the second coordinates) of each piece of the content information CT6 is equal to or shorter than the threshold value D3, and the content information CT6 equal to or smaller than the threshold value D3 is identified from the Web page. In the example shown in FIG. 9C, the coordinates (x4, y4) corresponding to the center position of the product image G6 are the reference coordinates. In the example case shown in FIG. 9C, a check is made to determine whether the distance d3 between the coordinates (x3, y3) corresponding to the display position of the object OB2 and the reference coordinates (x4, y4) of the content information CT6 is equal to or shorter than the threshold value D3. With the display position of the object OB3 in this case, the distance is determined not yet to be equal to or shorter than the threshold value D3. Therefore, the action display operation to change the display form of the object OB3 is not performed. Meanwhile, the object OB2 shown in FIG. 9 is displayed and moved in the downward direction in FIG. 9. After a predetermined period of time, the object OB2 reaches the display position shown in FIG. 9B. As a result, the distance d3' between the coordinates (x3', y3') corresponding to the display position of the object OB2 and the reference coordinates (x4, y4) of the content information CT6 is determined to be equal to or shorter than the threshold value D3 (or the reference coordinates (x3, y3) of the content information CT6 are determined to be in the range R of the object OB2 in the downward direction), as shown in FIG. 9D. Accordingly, the content information CT6 is determined to be displayed around the object OB2 (YES in step S18 shown in FIG. 6). In this manner, the content information CT6 displayed around the object OB2 is identified from the Web page (step S19 shown in FIG. 6). Since the content information CT6 shown in FIG. 9B contains the text "the greatest bargain!!", the action information 51 that is the script for "jumping" associated with the candidate content information 50 indicating "the greatest bargain" is determined from the correspondence information shown in FIG. 3, for example (step S21 shown in FIG. 6). Based on the determined action information 51 that is the script for "jumping", the display form of the object OB2 is changed to "a person who is jumping" as shown in FIG. 9B (step S22 shown in FIG. 6).

FIG. 10 is a conceptual diagram showing the above described ranges R of the object OB1 and the like displayed on the Web page after a predetermined period of time has passed since the display of the Web page shown in FIG. 7. As shown in FIG. 10, the display forms of the objects OB1 and OB2 are changed when the reference coordinates of the content information CT1 and the like enter the ranges R thereof. However, the display forms of the other object OB3 and the like are not changed, since the reference coordinates of the content information CT1 and the like have not entered the ranges R thereof. In a case where the object OB1 is moving in the rightward or leftward direction, the range R in the upward direction (or the downward direction) perpendicular to the rightward and leftward directions) is made longer as shown in FIG. 8C, and the range R in the travelling direction may be made longer as shown in FIG. 9C.

As described above, according to this embodiment, the information providing server 1 acquires the page data of a Web page, incorporates the object display operation script into the acquired page data in an executable manner, and transmits the page data of the Web page having the object display operation script incorporated thereinto to a user terminal 2-$k$ in response to a request from the user terminal 2-$k$. Accordingly, a Web page created to be provided over the network NW can be efficiently improved to make the display contents appealing to users, and the improved Web page can be provided to users. For example, in a case where it is difficult for a shop (or a site operator) to create scripts, the script for the above described improvement is incorporated into a Web page simply by uploading the page data of the Web page created by the shop (or the site operator) into the information providing server 1, and the Web page having the script incorporated thereinto can be provided to users. Further, according to this embodiment, the layout of a Web page can be flexibly changed.

In a display operation performed by the information providing system S according to the first embodiment, the content information CT1 or the like displayed in a range R having a reference position that is the display position of the object OB1 or the like on a Web page is identified from the Web page, and the action information 51 associated with the candidate content information 50 corresponding to the identified content information CT1 or the like is determined by referring to the correspondence information. Based on the determined action information 51, the display form of the object OB1 or the like displayed on the Web page is changed. By changing the display form of the object OB1 or the like, the content information CT1 or the like displayed around the object OB1 or the like can be more effectively made appealing to users. Also, the content information displayed on the Web page can be efficiently made to reflect the contents intended by the site operator, for example.

While the object OB1 or the like is moved and displayed, and the display position of the object OB1 or the like is shifting, the content information CT1 or the like displayed in the range R having the display position as a reference position is identified from the Web page. Accordingly, in accordance with the shifting of the display position of the object OB1 or the like, the content information CT1 or the like displayed in the range R of the object OB1 or the like can be more effectively made appealing to users.

Also, the display position of the object OB1 or the like shifts outside the ranges in which product images and texts introducing the products are displayed on a Web page, degradation of the visibility of the product images and the texts introducing the products on the Web page can be reduced.

Figure 11A:
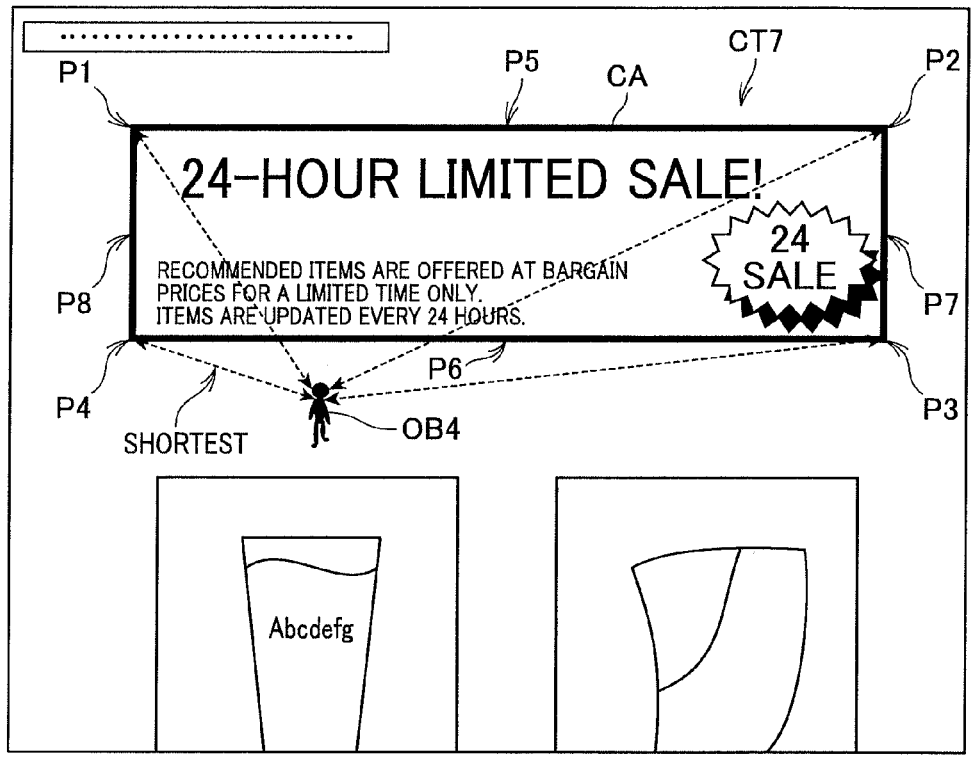
FIG. 11 are diagrams each showing an example display of a Web page (created by a shop that sells products) carrying detailed information about the products.

In the above described procedure of step S18, the reference coordinates are a set of coordinates among the group of coordinates contained in the display ranges of the content information CT1 and the like on a Web page. However, sets of coordinates may be used as reference coordinates. Referring now to FIG. 11A, an example procedure of step S18 in such a case is described. FIG. 11A is a diagram showing an example display of a Web page (created by a shop that sells products) carrying detailed information about the products. In the example shown in FIG. 11A, content information CT7 ("24-hour limited sale") and an object OB4 are displayed on a Web page. In the procedure of step S18 in this case, a check is made to determine whether the shortest distance (represented by the number of points, for example) among the distances between the coordinates corresponding to the display position of the object OB4 and respective predetermined sets of reference coordinates among the group of coordinates contained in the display range CA (a display range in which "24-hour limited sale" is surrounded by a bold line in FIG. 11A, for example) of the content information CT7 on the Web page is equal to or shorter than a predetermined threshold value. In a case where the shortest distance among the distances between the coordinates corresponding to the display position of the object OB4 and the respective sets of reference coordinates of the content information CT7 is equal to or shorter than the threshold value, the content information CT7 is identified (step S19 shown in FIG. 6). An example of the sets of reference coordinates may be the coordinates corresponding to arbitrary positions on the outer periphery of the content information CT7. For example, those sets of reference coordinates may be the four sets of reference coordinates corresponding to the positions (P1 to P4) at the corners of the content information CT7 shown in FIG. 11A, or the four sets of reference coordinates corresponding to the locations (P5 to P8) at the centers of the vertical sides (the left end and the right end) and the centers of the horizontal sides (the upper end and the lower end) of the content information CT7, for example.

Figure 11B:
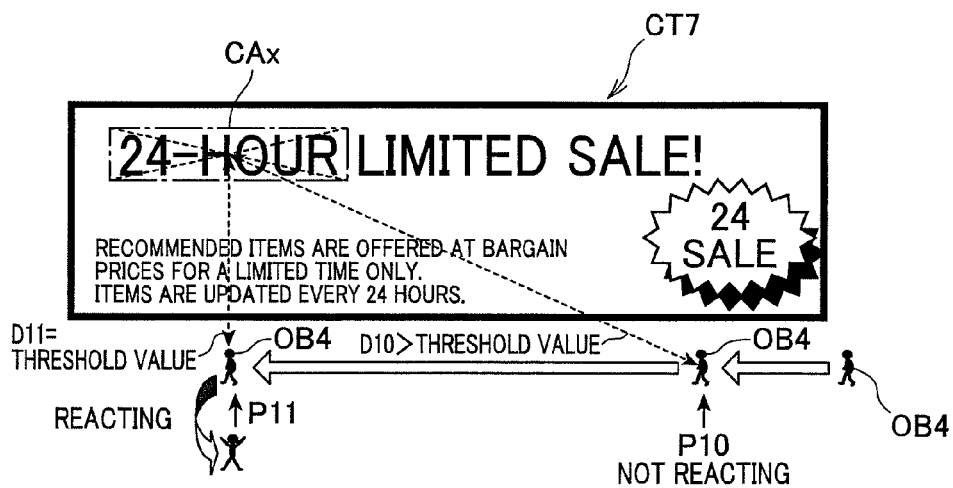

Also, in the above described procedure of step S18, one or more sets of coordinates among the group of coordinates contained in a partial display range of content information may be used as reference coordinates. Referring now to FIG. 11B, an example procedure of step S18 in such a case is described. FIG. 11B is a diagram showing the portion containing the content information CT7 in the Web page shown in FIG. 11A. In the example shown in FIG. 11B, one or more sets of coordinates among the group of coordinates contained in a partial display range CAx of the content information CT7 (the display range of "24-hour" surrounded by a dot-and-dash line) are used as reference coordinates. The reference coordinates in this case may be the coordinates corresponding to the center position of the partial display range CAx of the content information CT7 shown in FIG. 11B, or the coordinates corresponding to arbitrary positions (the positions of the corners) on the outer periphery, for example. In the procedure of step S18 in this case, a check is made to determine whether the distance between the coordinates corresponding to the display position of the object OB4 and the reference coordinates of the partial display range CAx of the content information CT7 (or the shortest distance among the distances from the respective sets of reference coordinates as in the above described case) is equal to or shorter than a threshold value. As shown in FIG. 11B, when the object OB4 is located in a display position P10, the distance D10 between the coordinates corresponding to the display position of the object OB4 and the reference coordinates of the partial display range CAx of the content information CT7 is longer than the threshold value. Therefore, an action display operation to change the display form of the object OB4 is not performed (the object OB4 does not react). Meanwhile, when the object OB4 moves leftward and reaches a display position P11, the distance D11 between the coordinates corresponding to the display position of the object OB4 and the reference coordinates of the partial display range CAx of the content information CT7 becomes equal to the threshold value, as shown in FIG. 11B. Therefore, an action display operation to change the display form of the object OB4 is performed based on the action information 51 corresponding to the content information CT7 (the object OB4 reacts). It should be noted that the action information 51 used here may be the action information 51 associated with the candidate content information 50 matching the text ("24-hour limited sale" in this case) contained in the display range CA of the entire content information CT7, or may be the action information 51 associated with the candidate content information 50 matching the text ("24-hour" in this case) contained in the partial display range CAx of the content information CT7 (the same applies to the cases shown in FIGS. 12A and 12B).

Figure 12A:
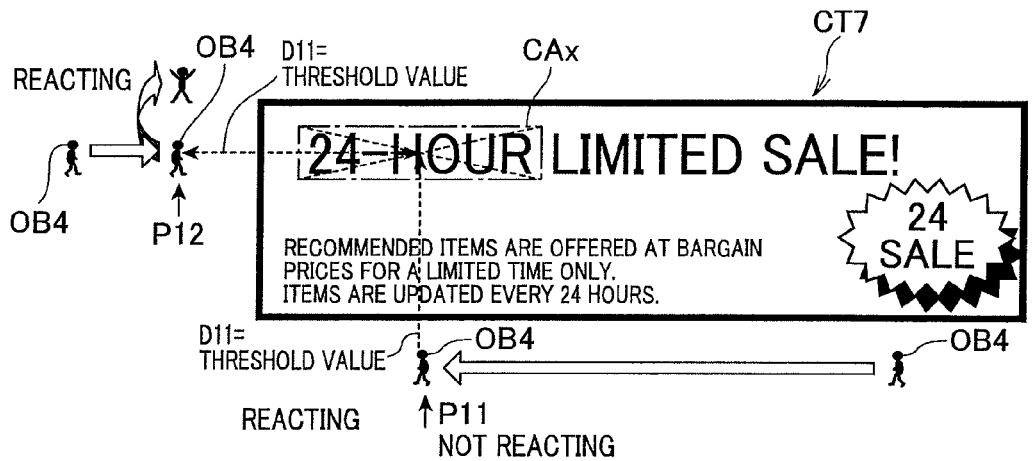
FIG. 12 is a diagram showing the portion containing the content information CT7 in the Web page shown in FIG. 11.
Figure 12B:
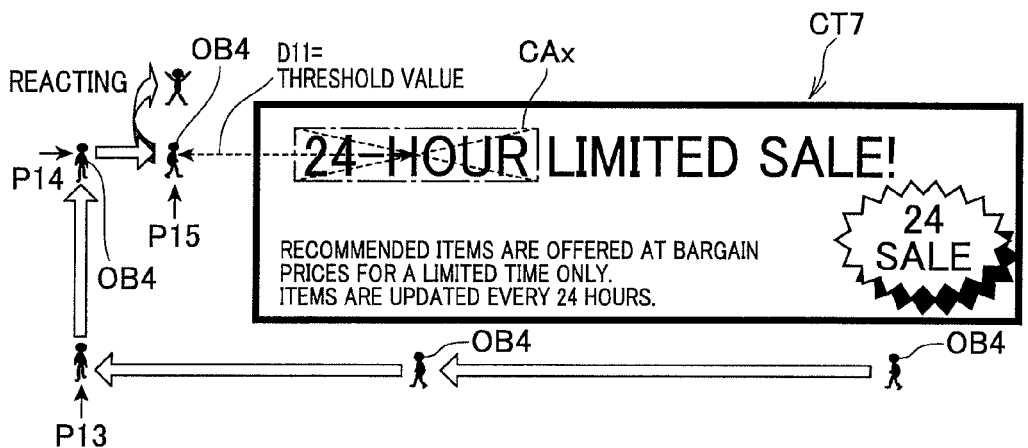

Even in a case where the distance between the coordinates corresponding to the display position of the object OB4 and the reference coordinates of the partial display range CAx of the content information CT7 becomes equal to or shorter than the threshold value, an action display operation to change the display form of the object OB4 may not be performed if the content information CT7 does not exist in the travelling direction of the object OB4. In this case, even when the object OB4 moves leftward and reaches the display position P11 (when the positional relationship between the object OB4 and the partial display range CAx of the content information CT7 changes to a predetermined number of points), the partial display range CAx of the content information CT7 does not exist in the travelling direction of the object OB4, as shown in FIG. 12A, for example. Therefore, an action display operation to change the display form of the object OB4 is not performed (the object OB4 does not react). On the other hand, in a case where the object OB4 moves rightward and reaches a display position P12 (the positional relationship between the object OB4 and the partial display range CAx of the content information CT7 changes to a predetermined number of points), and the partial display range CAx of the content information CT7 exists in the travelling direction of the object OB4, as shown in FIG. 12A, an action display operation to change the display form of the object OB4 is performed based on the action information 51 corresponding to the content information CT7 (the object OB4 reacts). Further, in a case shown in FIG. 12B, when the object OB4 moves leftward (in the travelling direction) and reaches a display position P13, the travelling direction is changed to the upward direction. The object OB4 further moves in the upward direction and reaches a display position P14. As a result, the positional relationship between the object OB4 and the partial display range CAx of the content information CT7 changes to a predetermined number of points. In this case, the travelling direction of the object OB4 may be changed to the rightward direction in which the partial display range CAx of the content information CT7 exists. In this case, when the object OB4 further moves rightward and reaches a display position P15, and the positional relationship between the object OB4 and the partial display range CAx of the content information CT7 changes to a predetermined number of points, the partial display range CAx of the content information CT7 exists in the travelling direction of the object OB4, as shown in FIG. 12B. Therefore, an action display operation to change the display form of the object OB4 is performed based on the action information 51 corresponding to the content information CT7 (the object OB4 reacts).

Figure 12C:
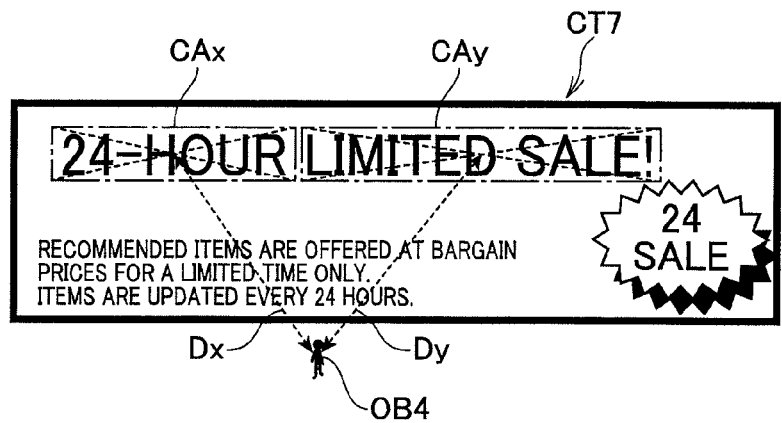

Although the positional relationship between the object OB4 and the partial display range CAx of the content information CT7 is determined in the examples shown in FIGS. 12A and 12B, there may be more than one partial display range as shown in FIG. 12C. In the example shown in FIG. 12C, the positional relationships between the object OB4 and a partial display range CAx (the display range of "24-hour" surrounded by a dot-and-dash line) and another partial display range CAy (the display range of "limited sale" surrounded by a dot-and-dash line) of the content information CT7 are to be determined. In a case where the distance between the coordinates corresponding to the display position of the object OB4 and the reference coordinates of the partial display range CAx of the content information CT7 becomes equal to the threshold value, an action display operation to change the display form of the object OB4 is performed based on the action information 51 associated with the candidate content information 50 matching the text ("24-hour" in this case) contained in the partial display range CAx of the content information CT7. Also, in a case where the distance between the coordinates corresponding to the display position of the object OB4 and the reference coordinates of the partial display range CAy of the content information CT7 becomes equal to the threshold value, an action display operation to change the display form of the object OB4 is performed based on the action information 51 associated with the candidate content information 50 matching the text ("limited sale" in this case) contained in the partial display range CAy of the content information CT7. Meanwhile, there are cases where the distance Dx between the coordinates corresponding to the display position of the object OB4 and the reference coordinates of the partial display range CAx of the content information CT7 becomes equal to the threshold value, and the distance Dy between the coordinates corresponding to the display position of the object OB4 and the reference coordinates of the partial display range CAy of the content information CT7 also becomes equal to the threshold value (Dx and Dy representing the same distances, for example), as shown in FIG. 12C. In this case, the system control unit 27 compares the area occupied by the text ("24-hour" in this case) contained in the partial display range CAx of the content information CT7 with the area occupied by the text ("limited sale" in this case) contained in the partial display range CAy of the content information CT7, and an action display operation to change the display form of the object OB4 is performed based on the action information 51 associated with the candidate content information 50 matching the text ("limited sale" in this case) contained in the display range occupying the larger area, in accordance with the object display operation script.

(II) Second Embodiment

Figure 13:
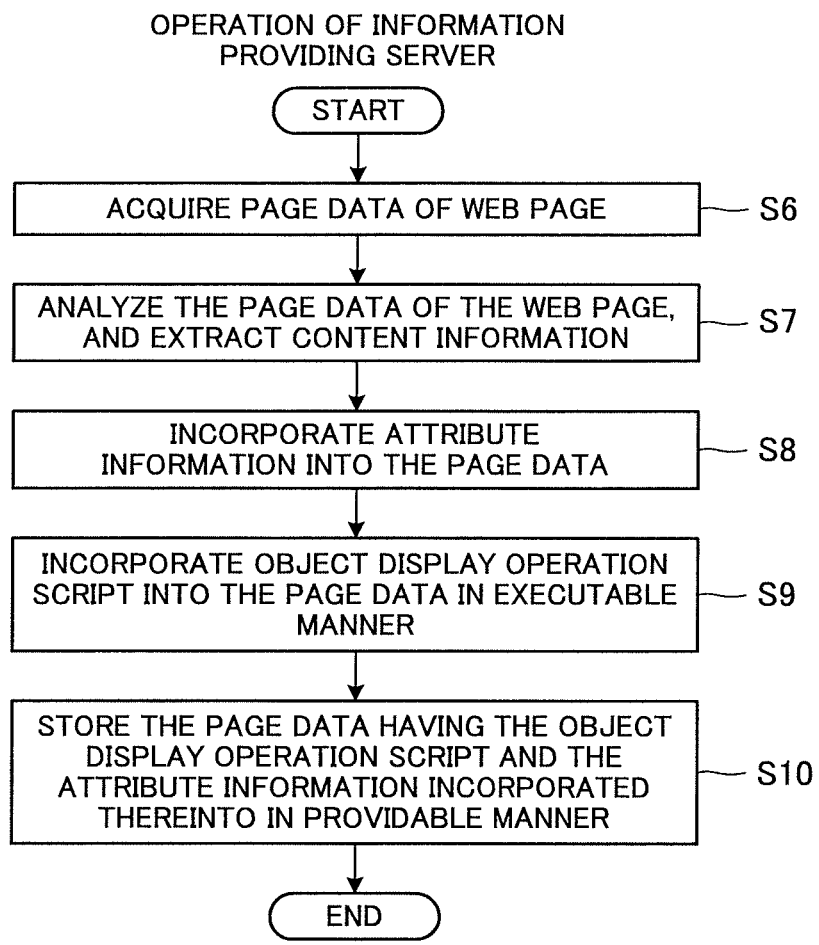
FIG. 13 is a flowchart showing a script incorporating operation according to a second embodiment.
Figure 14:
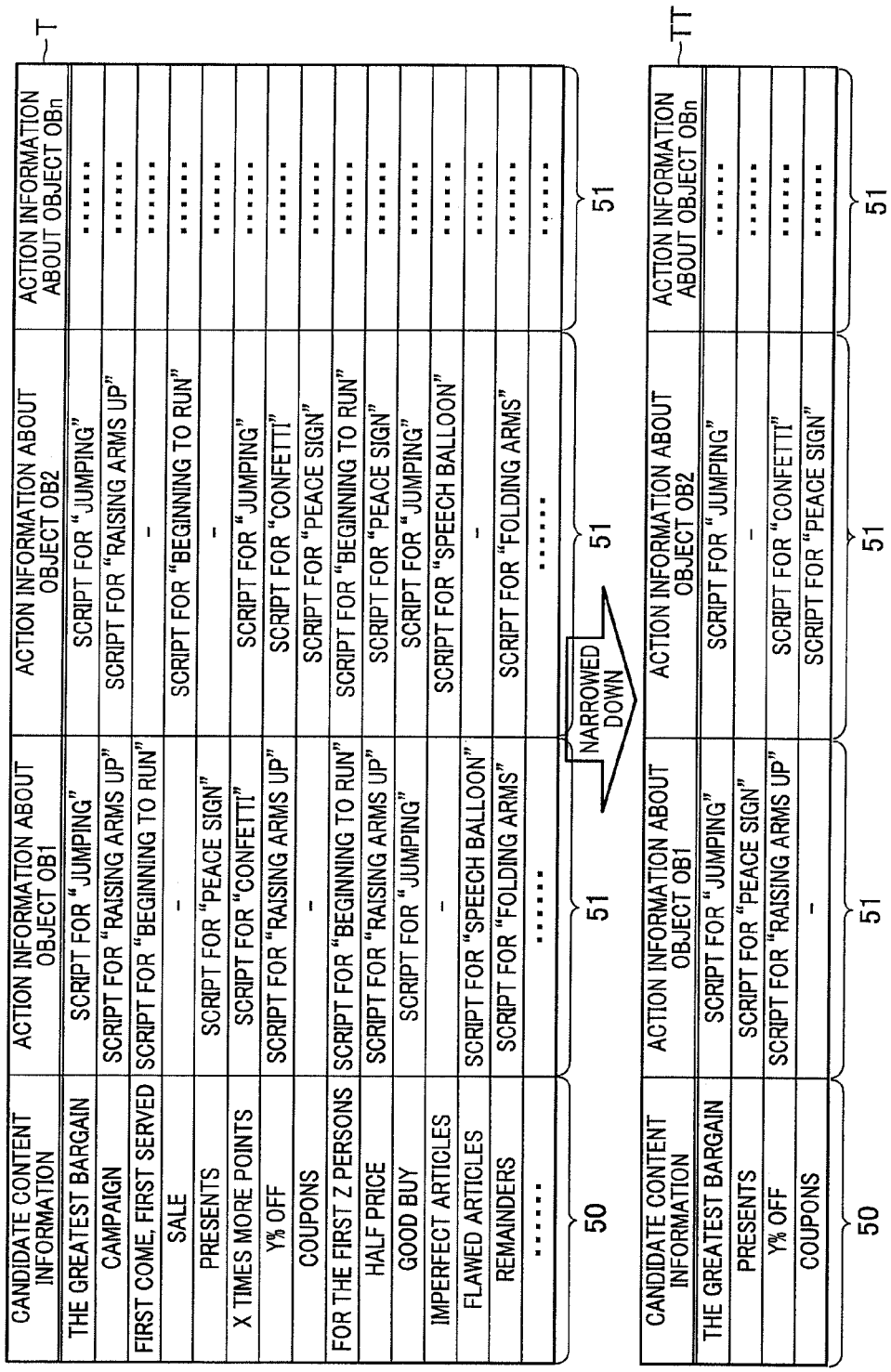
FIG. 14 is a diagram showing example correspondence information in the form of a table according to the second embodiment.
Figure 15:
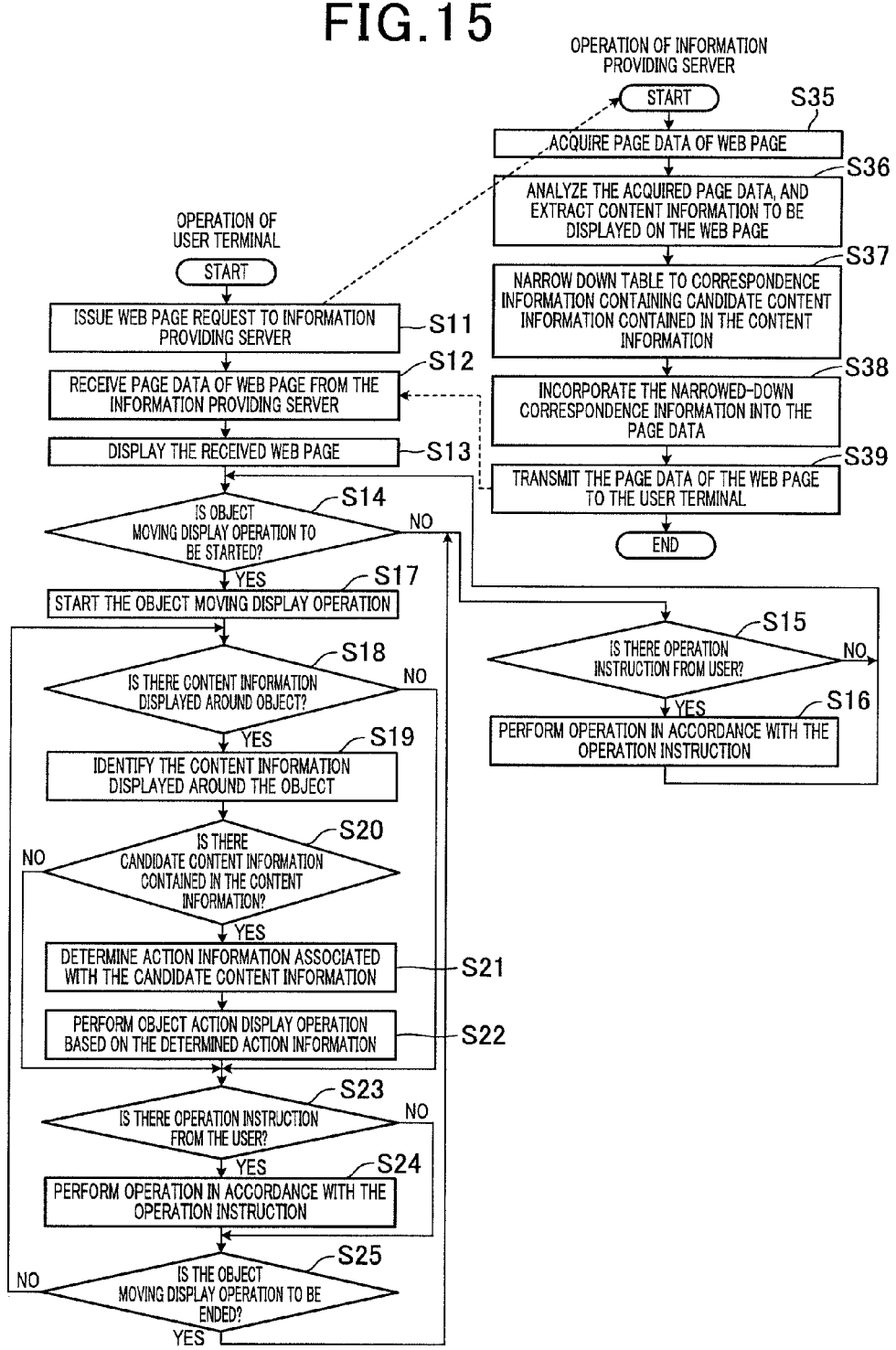
FIG. 15 is a flowchart showing a display operation according to the second embodiment.
Figure 16:
FIG. 16 is a diagram showing example correspondence information in the form of a table according to a modification of the second embodiment.

Referring now to FIGS. 13 to 16, operations of an information providing system S according to a second embodiment are described. FIG. 13 is a flowchart showing a script incorporating operation according to the second embodiment. FIG. 14 is a diagram showing example correspondence information in the form of a table according to the second embodiment. FIG. 15 is a flowchart showing a display operation according to the second embodiment. FIG. 16 is a diagram showing example correspondence information in the form of a table according to a modification of the second embodiment.

Referring first to FIG. 13, a script incorporating operation to be performed by the information providing server 1 is described.

Like the script incorporating operation shown in FIG. 5, the script incorporating operation shown in FIG. 13 is started when an upload request from a shop terminal 3-j is received. Step S6 shown in FIG. 13 is the same as step S1 shown in FIG. 5.

The page data of the Web page acquired in step S6 is then analyzed, and content information is extracted (step S7). For example, the system control unit 14 acquires text data as a search result by conducting a full-text search in the structured Literature related to the page data, and extracts the content information containing the text data.

The system control unit 14 then incorporates attribute information into the page data of the Web page acquired in step S6 (step S8). For example, the system control unit 14 in this case adds a name attribute (without a value) (<span name> or <div name>, for example) as the attribute information to the span tag (<span> content information </span>) or the div tag (<div> content information (20% OFF, for example)</div>) specifying the extracted content information. In this manner, the attribute information is incorporated into the page data.

The system control unit 14 then acquires the object display operation script from the storage unit 12, and incorporates the object display operation script, in an executable manner, into the page data having the attribute information incorporated thereinto in step S8 (step S9). At this point, the above described correspondence information is not incorporated into the page data. Alternatively, after incorporating the object display operation script, in an executable manner, into the page data acquired in step S6, the system control unit 14 may incorporate the attribute information into the page data in step S8.

The system control unit 14 then stores the page data having the object display operation script and the attribute information incorporated thereinto, into the storage unit 12 in a providable manner (step S10).

The script incorporating operation shown in FIG. 13 can also be performed on the page data of a Web page that is created by the site operator and is uploaded from a terminal being used by the site operator. In the case of a Web page created by the site operator, not only the page data of the created Web page (a campaign page or the like) is uploaded from a terminal being used by the site operator, but also the information providing server 1 can acquire the page data from the storing means that stores the page data in a predetermined manner.

Referring now to FIG. 15, a display operation to be performed by the information providing server 1 and a user terminal 2-k is described. In the flowchart shown in FIG. 15, the same procedures as those in the flowchart showing a display operation according to the first embodiment in FIG. 6 are denoted by the same step numbers as those in FIG. 6, and detailed explanation of them is not provided herein. Further, in the following description of the second embodiment, the same reference numerals as those used for the information providing system S according to the first embodiment are used.

In the above described first embodiment, all the correspondence information registered in the table T stored in the DB 121 of the information providing server 1 is incorporated into page data and is transmitted to a user terminal 2-k. In the second embodiment described below, on the other hand, the correspondence information registered in the table T stored in the DB 121 is narrowed down in accordance with content information CT1 and the like displayed on a requested Web page, and the narrowed-down correspondence information is transmitted to the user terminal 2-k.

Referring now to FIG. 15, a display operation to be performed by the information providing server 1 and a user terminal 2-k is described.

Like the display operation shown in FIG. 6, the display operation shown in FIG. 15 is started by the user of the user terminal 2-k operating the operation unit 21 to issue an operation instruction to request a Web page, after activation of the Web browser program. The Web page request is then sent to the information providing server 1 (step S11). When the information providing server 1 receives the Web page request, the system control unit 14 of the information providing server 1 acquires the page data of the requested Web site from the storage unit 12 (step S35).

The system control unit 14 then analyzes the obtained page data of the Web page, and extracts the content information CT1 and the like to be displayed on the Web page from the page data (step S36). For example, after acquiring text data as a search result by conducting a full-text search in the structured Literature related to the page data by using the above described "span name" or "div name", the system control unit 14 refers to the candidate content information registered in the DB 121, and determines whether the text data containing the candidate content information is contained in the search result. If the system control unit 14 determines that the text data containing the candidate content information (or the text data containing part of the candidate content information) is contained in the search result, the content information CT1 or the like containing the text data is extracted. Further, the system control unit 14 adds a name attribute value (<span name="content"> or <div name="content">, for example) as the attribute information for making the extracted content information identifiable by the object display operation script, to the span tag (or the div tag) specifying the extracted content information.

As described above, in the second embodiment, the content information CT1 or the like containing the candidate content information registered in the DB 121 is extracted when a Web page request is issued. Accordingly, even in a case where a change (such as an addition or deletion of candidate content information) is made to the contents registered in the DB 121, the object display operation script can be executed based on the latest correspondence information without any problem.

The system control unit 14 then narrows down the correspondence information (or a record) containing the candidate content information 50 corresponding to the content information CT1 or the like (or contained in the content information CT1 or the like) extracted from the table T stored in the DB121 through the procedure of step S36 (step S37). The system control unit 14 in this case functions as the "narrowing-down means" according to the present invention. As a result of step S37, the correspondence information is narrowed down to correspondence information (to be registered in a new table TT) containing "the greatest bargain", "presents", "Y % OFF", and "coupons" as the candidate content information 50 in the example case shown in FIG. 14, for example. After that, the system control unit 14 incorporates (writes) the narrowed-down correspondence information into the page data (or the object display operation script, for example) acquired through the procedure of step S35 (step S38).

The system control unit 14 then transmits the page data of the Web page having the narrowed-down correspondence information incorporated thereinto, to the user terminal 2-k that has transmitted the Web page request in step S11 (step S39). As a result, the system control unit 27 of the user terminal 2-k uses the page data transmitted from the information providing server 1, to carry out the procedures of steps S12 to S25, which are the same as those of the first embodiment. In the Web page displayed on the display screen of the display unit 22 of the user terminal 2-k in this case, the display form of the object OB1 or the like displayed and moved on the Web page is changed in accordance with the content information CT1 or the like identified from the relationship with the display position of the object OB1 or the like, as in a Web page according to the first embodiment (see FIGS. 7 and 10).

As described above, a display operation performed by the information providing system S of the second embodiment has the same effects as those of a display operation performed by the information providing system S of the first embodiment, and also has the following effects. The content information CT1 or the like displayed on a Web page is extracted by the information providing server 1. The correspondence information containing the candidate content information 50 corresponding to the extracted content information CT1 or the like is narrowed down, and the page data containing the narrowed-down correspondence information is transmitted to a user terminal 2-k. Accordingly, the correspondence information narrowed down in the information providing server 1 is transmitted to a user terminal 2-k to determine action information 51. Thus, the processing load of the user terminal 2-k is reduced, and the content information CT1 and the like displayed on the Web page can be more effectively made appealing to users.

In a modification of the above described second embodiment, genre information 52 indicating the genre (category) of the candidate content information 50 registered in a table TX stored in the DB 121 may be associated with the candidate content information 50 and be registered, as shown in FIG. 16. With the use of the genre information 52, the table TX is narrowed down to the correspondence information containing the candidate content information 50 to be transmitted to a user terminal 2-k. In this case, genre information indicating the genre of the content information CT1 and the like (the genre is fruits if the Web page is designed for displaying information about fruits, for example) provided on a Web page is written in the page data of the Web page. In step S36, the system control unit 14 analyzes the obtained page data of the Web page, and extracts the genre information from the page data. In step S37, the system, control unit 14 narrows down the table TX stored in the DB 121 to the correspondence information (to be registered in a new table TTX) containing the candidate content information 50 associated with the same genre information 52 as the genre information extracted through the procedure of step S36. The procedures of step S37 and thereafter are the same as the above described ones. In this modification, page data is not analyzed, and each piece of the content information CT1 and the like is not extracted from the page data. Instead, genre information is extracted. Accordingly, the processing load of the information providing server 1 can be reduced. Particularly, this modification is effective in a case where a large number of pieces of content information CT1 and the like are displayed on a Web page.

(III) Third Embodiment

Figure 17:
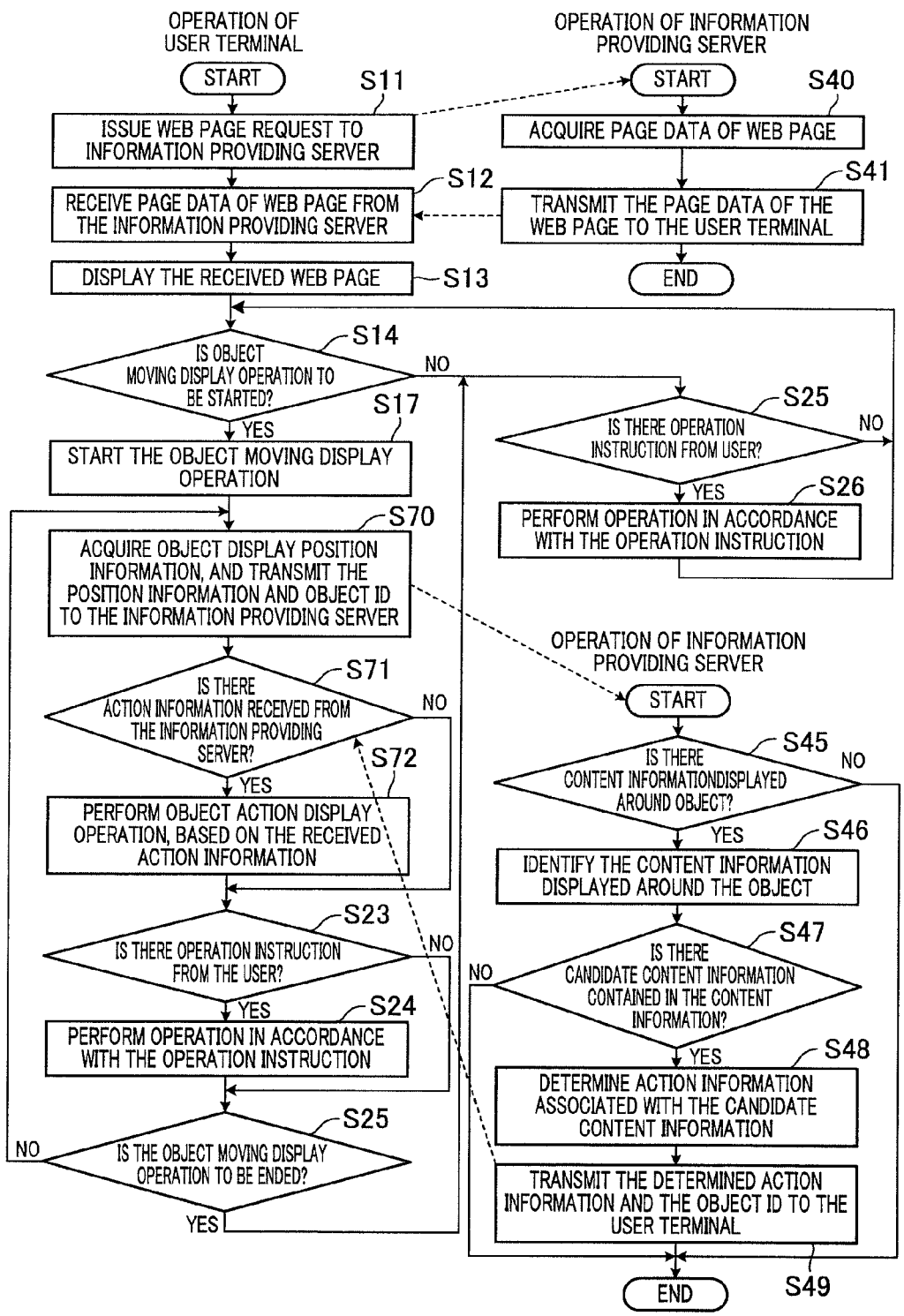
FIG. 17 is a flowchart showing a display operation according to a third embodiment.

Referring now to FIG. 17, operations of an information providing system S according to a third embodiment are described. A script incorporating operation according to the third embodiment is the same as the script incorporating operation according to the second embodiment (FIG. 13). FIG. 17 is a flowchart showing a display operation according to the third embodiment. The same procedures as those in the flowchart showing a display operation according to the first embodiment shown in FIG. 6 are denoted by the same step numbers as those in FIG. 6, and detailed explanation of them is not provided herein. Further, in the following description of the third embodiment, the same reference numerals as those used for the information providing system S according to the first embodiment are used. The table T stored in the DB 121 of the information providing server 1 according to the third embodiment is the same as the table T according to the first embodiment.

In the above described first embodiment, the correspondence information acquired from the table T stored in the DB 121 of the information providing server 1 is incorporated into page data, and the page data is transmitted to a user terminal 2-$k$. In the third embodiment described below, on the other hand, the correspondence information is not transmitted to a user terminal 2-$k$. In the display operation according to the third embodiment, position information indicating the display position of an object OB1 or the like being displayed and moved on a Web page at a user terminal 2-$k$ is transmitted from the user terminal 2-$k$ to the information providing server 1. The information providing server 1 manages the display positions of the object OB1 and the like (or the movement paths of the object OB1 and the like). In a case where the later described conditions are satisfied, the action information 51 specifying variations of the display form of the object OB1 or the like is determined, and is transmitted to the user terminal 2-$k$. The display form of the object OB1 or the like displayed on the Web page is then changed accordingly.

Referring now to FIG. 17, a display operation to be performed by the information providing server 1 and a user terminal 2-$k$ is described.

Like the display operation shown in FIG. 6, the display operation shown in FIG. 17 is started by the user of the user terminal 2-$k$ operating the operation unit 21 to issue an operation instruction to request a Web page, after activation of the Web browser program. The Web page request is then sent to the information providing server 1 (step S11). When the information providing server 1 receives the Web page request, the system control unit 14 of the information providing server 1 acquires the page data of the requested Web site from the storage unit 12 (step S40), and transmits the acquired page data to the user terminal 2-$k$ (step S41). As a result, the system control unit 27 of the user terminal 2-$k$ receives the page data transmitted from the information providing server 1 (step S12), and carries out the procedures of steps S13 to S17, which are the same as those of the first embodiment.

When the moving display of the object OB1 or the like is started at the user terminal 2-$k$ as a result of the determination in step S14 (step S17), the system control unit 27 causes the information providing server 1 to identify the content information displayed in a predetermined range based on the display position of the object OB1 or the like on the Web page, and carries out the procedures (steps S70 and S71) for causing the information providing server 1 to determine the action information 51 associated with the candidate content information 50 corresponding to the identified content information CT1 or the like, in accordance with the object display operation script. In this operation, the system control unit 27 acquires object display position information indicating the display position of the object OB1 or the like being moved and displayed on the Web page, and transmits the set of the acquired object display position information and an object ID to the information providing server 1 (step S70). Here, the object display position information contains the coordinates (x1, y1) corresponding to the display position of the object OB1 or the like, for example. The object ID is written in the setting file contained in the page data, and serves as the identification information unique to each of the object OB1 and the like. In a case where more than one of the object OB1 and the like is displayed on a Web page, the set of the object display position information and the object ID of each of the object OB1 and the like is transmitted to the information providing server 1.

When the set of the object display position information and the object ID is received by the information providing server 1, the system control unit 14 carries out the procedure of step S45 shown in FIG. 17. That is, based on the object display position information received from the user terminal 2-$k$ and the page data of the Web page transmitted from the user terminal 2-$k$ in step S41, the system control unit 14 of the information providing server 1 determines whether the content information CT1 or the like is displayed around the object OB1 or the like being moved and displayed at the user terminal 2-$k$ (step S45). In this manner, the content information CT1 or the like is identified from the Web page. In the determination in step S45, based on the display position of the object OB1 or the like indicated by the object display position information on the Web page, the system control unit 14 of the information providing server 1 determines whether the content information CT1 or the like is displayed in a predetermined range on the Web page. The specific determination method in step S45 is the same as the determination method in step S18 according to the first embodiment, except that the table T stored in the DB 121 of the information providing server 1 and the object display position information received from the user terminal 2-$k$ are used. Therefore, detailed explanation of the method is not provided herein.

In a case where it is determined in step S45 that the content information CT1 and the like are not displayed around all the object OB1 and the like being moved and displayed (NO in step S45), the system control unit 14 ends the display operation according to the third embodiment, and does not change the display forms of the object OB1 and the like at the user terminal 2-$k$. In a case where it is determined in step S45 that the content information CT1 or the like is displayed around the object OB1 or the like being moved and displayed (YES in step S45), on the other hand, the system control unit 14 identifies the content information CT1 or the like displayed around the object OB1 or the like from the Web page (step S46). The specific identification method in step S46 is the same as the identification method in step S19 according to the first embodiment, except that the table T stored in the DB 121 and the object display position information received from the user terminal 2-$k$ are used. Therefore, detailed explanation of the method is not provided herein.

In a case where the content information CT1 or the like is identified through the procedure of step S46, the system control unit 14 determines whether any of the candidate content information 50 contained in the table T stored in the DB 121 is contained in the identified content information CT1 or the like, by referring to the correspondence information registered in the table T (step S47). The specific determination method in step S47 is also the same as the determination method in step S20 according to the first embodiment, except that the table T stored in the DB 121 is used. Therefore, detailed explanation of the method is not provided herein. In a case where it is determined in step S47 that any of the candidate content information 50 is not contained in the identified content information CT1 or the like (NO in step S47), the system control unit 14 ends the display operation according to the third embodiment, and does not change the display forms of the object OB1 and the like at the user terminal 2-$k$.

In a case where it is determined in step S47 that some of the candidate content information 50 is contained in the identified content information CT1 or the like (YES in step S47), on the other hand, the system control unit 14 refers to the correspondence information registered in the table T, and determines the action information 51 associated with the candidate content information 50 contained in the content information CT1 or the like (step S48). The specific determination method in step S48 is also the same as the determination method in step S21 according to the first embodiment, except that the table T stored in the DB 121 is used. Therefore, detailed explanation of the method is not provided herein.

After that, the system control unit 14 transmits the action information 51 determined through the procedure of step S48 and the object ID transmitted from the user terminal 2-$k$ through the procedure of step S70 (or the object ID for identifying the object OB1 or the like having the display form to be changed according to the determined action information 51), to the user terminal 2-$k$ that has transmitted the object display position information and the object ID through the procedure of step S70 (step S49). The system control unit 14 then ends the display operation according to the third embodiment. The procedures of steps S45 to S49 are carried out every time object display position information and an object ID are received from a user terminal 2-$k$.

Meanwhile, the system control unit 27 of the user terminal 2-$k$ that has transmitted the object display position information and the object ID through the procedure of step S70 awaits reception of the action information 51 and the object ID from the information providing server 1 for a predetermined period of time. In a case where the action information 51 and the object ID are not transmitted after the predetermined period of time has passed (NO in step S71), the operation moves on to step S23. In a case where the action information 51 and the object ID are received (YES in step S71), on the other hand, the system control unit 27 of the user terminal 2-$k$ performs an action display operation on the object OB1 or the like corresponding to the object ID, based on the script written as the received action information 51 (step S72). The specific action display operation in step S72 is the same as the action display operation in step S22 according to the first embodiment, except that the action information 51 transmitted together with the object ID from the information providing server 1 is used. Therefore, detailed explanation of the action display operation is not provided herein. The procedures of steps S70 to S72 at the user terminal 2-$k$ and the procedures of steps S45 to S49 at the information providing server 1 are carried out for each of the object OB1 and the like in a case where more than one of the object OB1 and the like is displayed on a Web page. Also, those procedures are repeatedly carried out at predetermined intervals for each of the object OB1 and the like.

When the procedure of step S72 is carried out for the object OB1 or the like identified from the object ID, the system control unit 27 of the user terminal 2-$k$ thereafter carries out the same procedures as those of steps S23 to S25 of the first embodiment. In a case where it is determined in step S25 that the moving display operation for the object OB1 or the like is not to be ended (NO in step S25), the system control unit 27 moves on to the procedure of step S70.

As described above, a display operation to be performed by the information providing system S according to the third embodiment has the same effects as those of a display operation to be performed by the information providing system S according to the first embodiment, and also has the following effects. A user terminal 2-$k$ causes the information providing server 1 to identify the content information CT1 or the like, and determine the action information 51 associated with the candidate content information 50 corresponding to the identified content information CT1 or the like. Accordingly, the processing load of the user terminal 2-$k$ is reduced, and the display positions of the object OB1 and the like (or the movement paths of the object OB1 and the like) can be managed at the information providing server 1. Also, the content information CT1 and the like displayed on a Web page at the user terminal 2-$k$ can be more effectively made appealing to users.

In each of the above described embodiments, the reference coordinates of the object OB1 or the like are identified by using coordinate axes, with the origin being the upper left corner of the Web page. However, in a case where the entire display region of a Web page is divided into divisional regions each containing a piece of the content information CT1 and the like, and one of the divisional regions contains the reference coordinates of the object OB1 or the like, the content information CT1 or the like displayed in the divisional region containing the reference coordinates of the object OB1 or the like may be identified as the content information CT1 or the like existing around the object OB1 or the like having its reference coordinates contained in the divisional region.

Also, there are some other examples of display forms indicated by the action information 51. In a case where the content information CT1 or the like having its reference coordinates within the range(s) R of the object OB1 or the like is the content information CT1 or the like indicating an advertisement for a product or a service, evaluation information indicating evaluations by users, such as reviews and comments about the product or the like contained in the content information CT1 or the like, is obtained from a predetermined database (not shown), and a comment based on the obtained evaluation information may be displayed in the form of a speech balloon in the vicinity of the display position of the object OB1 or the like. The action information 51 in this case may be a script for "speech balloon" in the table T shown in FIG. 3, for example. With this arrangement, the content information CT1 or the like is information for advertising a product or a service, and a review or the like can be associated with the object OB1 or the like and be displayed as an action specified by the corresponding action information 51. Accordingly, the content information CT1 or the like for advertising a product or a service can be more effectively made appealing to users.

In each of the above described embodiments, the display forms of the objects OB1 and the like on a Web page are changed based on the action information 51. However, outputs of sound (voices, sound effects, or the like) associated with the object OB1 and the like may be changed based on action information 51 specifying sound outputs.

Further, a program for carrying out the procedures shown in the flowcharts shown in FIG. 6, 15, or 17 may be stored in a storage medium such as a CD, or may be obtained and stored via the network NW. The program may be read and executed by a general-purpose microcomputer or the like, so that the microcomputer or the like can function as the system control unit 14 or 27 according to an embodiment.

DESCRIPTION OF REFERENCE NUMERALS

1 Information providing server
2-$k$ User terminal
3-$j$ Shop terminal
11, 23 Communication unit
12, 25 Storage unit
13, 26 Input/output interface unit
14, 27 System control unit
15, 28 System bus
21 Operation unit
22 Display unit 24 Drive unit
50 Candidate content information
51 Action information
52 Genre information
NW Network
S Information providing system

The invention claimed is:

1. An information processing device that transmits page data constituting a Web page to a terminal device via a network, the information processing device comprising:
   a first acquiring means that acquires page data constituting a Web page for displaying first content information, the Web page being created to be provided to the terminal device via the network;
   a second acquiring means that acquires a script from a storing means that stores the script, the script being programmed to allow reference to correspondence information associating candidate content information set beforehand as a candidate for content information to be displayed on the Web page with variation information specifying variations of at least a display form of an object to be displayed on the Web page, the object being different from the candidate content information, the script causing the terminal device to carry out: an object display step of displaying an object on the Web page; an identifying step of identifying, from among the first content information of the Web page, second content information displayed in a predetermined range on the Web page, the range being set beforehand based on a display position of the object on the Web page; a determining step of determining the variation information associated with the candidate content information corresponding to the identified second content information by referring to the correspondence information; and a control step of changing at least the display form of the object displayed on the Web page, based on the determined variation information;
   an incorporating means that incorporates the script acquired by the second acquiring means into the page data acquired by the first acquiring means; and
   a transmitting means that transmits the page data having the script incorporated thereinto by the incorporating means, to the terminal device, in response to a request from the terminal device.

2. The information processing device according to claim 1, further comprising
   an extracting means that extracts content information, from among the first content information, containing the candidate content information by analyzing the page data acquired by the first acquiring means,
   wherein the incorporating means incorporates information for making the content information extracted by the extracting means identifiable by the script.

3. The information processing device according to claim 1, wherein
   the object display step includes causing the display position of the object to shift with time; and
   the identifying step includes identifying, from the Web page, the second content information displayed in the predetermined range, while the display position of the object is shifting.

4. The information processing device according to claim 1, wherein the identifying step includes identifying, from the Web page, the second content information having a distance equal to or shorter than a predetermined threshold value, the distance being a distance between first coordinates corresponding to the display position of the object and second coordinates determined beforehand among a group of coordinates contained in a display range of the second content information on the Web page.

5. The information processing device according to claim 4, wherein the threshold value is set for each of a plurality of directions on the Web page, with the display position of the object being a base point, and the threshold value in a first direction among the directions is larger than the threshold value in a second direction among the directions, the second direction being different from the first direction.

6. The information processing device according to claim 1, wherein the identifying step includes identifying, from the Web page, the second content information having a distance equal to or shorter than a predetermined threshold value, the distance being the shortest distance among distances between first coordinates corresponding to the display position of the object and a plurality of sets of second coordinates determined beforehand among a group of coordinates contained in a display range of the second content information on the Web page.

7. The information processing device according to claim 1, wherein the range is set for each of a plurality of directions on the Web page, with the display position of the object being a base point, and the range in a first direction among the directions is larger than the range in a second direction among the directions, the second direction being different from the first direction.

8. The information processing device according to claim 1, wherein the object display step includes causing the display position of the object to shift outside a display range in which an image or a text is displayed on the Web page.

9. The information processing device according to claim 2, wherein
   the correspondence information associating the variation information with each of a plurality of pieces of the candidate content information is stored in the storing means,
   the information processing device further comprises a narrowing-down means that narrows down the correspondence information stored in the storing means and corresponding to each piece of the candidate content information, to the correspondence information containing candidate content information corresponding to the content information extracted by the extracting means, and
   the transmitting means transmits the correspondence information narrowed down by the narrowing-down means, to the terminal device.

10. The information processing device according to claim 1, wherein
    the identifying step includes transmitting position information indicating a display position of the object on the Web page to the information processing device, and causing the information processing device to identify the second content information based on the position information and the page data, and
    the determining step includes causing the information processing device to determine the variation information associated with the candidate content information corresponding to the identified second content information.

11. An information processing method to be implemented by a computer that transmits page data constituting a Web page to a terminal device via a network,
    the information processing method comprising:

the step of acquiring page data constituting a Web page for displaying first content information, the Web page being created to be provided to the terminal device via the network;

the step of acquiring a script from a storing means that stores the script, the script being programmed to allow reference to correspondence information associating candidate content information set beforehand as a candidate for content information to be displayed on the Web page with variation information specifying variations of at least a display form of an object to be displayed on the Web page, the object being different from the candidate content information, the script causing the terminal device to carry out: an object display step of displaying an object on the Web page; an identifying step of identifying, from among the first content information of the Web page, second content information displayed in a predetermined range on the Web page, the range being set beforehand based on a display position of the object on the Web page; a determining step of determining the variation information associated with the candidate content information corresponding to the identified second content information by referring to the correspondence information; and a control step of changing at least the display form of the object displayed on the Web page, based on the determined variation information;

the step of incorporating the acquired script into the acquired page data; and the step of transmitting the page data having the script incorporated thereinto, to the terminal device, in response to a request from the terminal device.

12. An information processing method to be implemented by a computer that transmits page data constituting a Web page to a terminal device via a network, the information processing method comprising:

the step of acquiring page data constituting a Web page for displaying first content information, the Web page being created to be provided to the terminal device via the network;

the step of acquiring a script from a storing means that stores the script, the script being programmed to allow reference to correspondence information associating candidate content information set beforehand as a candidate for content information to be displayed on the Web page with variation information specifying variations of at least a display form of an object to be displayed on the Web page, the script causing the terminal device to carry out: an object display step of displaying an object on the Web page; an identifying step of identifying, from among the first content information of the Web page, second content information containing the candidate content information displayed in a predetermined range relative to a display position of the object on the Web page, the object being specified in the correspondence information; a determining step of determining the variation information associated with the candidate content information corresponding to the identified second content information by referring to the correspondence information; and a control step of changing at least the display form of the object displayed on the Web page, based on the determined variation information;

the step of incorporating the acquired script into the acquired page data; and the step of transmitting the page data having the script incorporated thereinto, to the terminal device, in response to a request from the terminal device.

* * * * *